United States Patent
Takasaki et al.

[11] Patent Number: 5,839,084
[45] Date of Patent: Nov. 17, 1998

[54] DRIVING-TORQUE CONTROL SYSTEM FOR FOUR-WHEEL-DRIVE VEHICLE

[75] Inventors: Toshiharu Takasaki, Sagamihara; Tomoyuki Hara, Isehara, both of Japan

[73] Assignee: Nissan Motor Co., Ltd., Yokohama, Japan

[21] Appl. No.: 529,465

[22] Filed: Sep. 18, 1995

[30] Foreign Application Priority Data

Sep. 21, 1994 [JP] Japan .................................. 6-226476

[51] Int. Cl.⁶ ........................... G06F 7/70; B60K 17/344
[52] U.S. Cl. ................................. 701/67; 701/68; 701/69; 701/66; 701/89; 180/248; 180/247; 180/233; 180/197; 477/35; 477/36; 477/903; 477/904
[58] Field of Search ..................... 364/424.098, 424.039, 364/426.021, 426.019, 424.089, 424.05, 424.045, 426.01, 426.026; 477/35, 903, 904, 36, 176, 174; 180/233, 197, 247, 249, 248; 701/90, 88, 66, 67, 69, 70, 80, 89, 81

[56] References Cited

U.S. PATENT DOCUMENTS

| | | | |
|---|---|---|---|
| 4,709,775 | 12/1987 | Watanabe et al. | 364/424.098 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 364/424.098 |
| 4,874,056 | 10/1989 | Naito | 364/424.098 |
| 4,890,685 | 1/1990 | Naito | 364/424.098 |
| 4,986,388 | 1/1991 | Matsuda | 364/424.098 |
| 5,190,130 | 3/1993 | Thomas et al. | 477/176 |
| 5,270,930 | 12/1993 | Ito et al. | 364/424.098 |
| 5,471,390 | 11/1995 | Sasaki | 364/426.023 |
| 5,631,829 | 5/1997 | Takasaki et al. | 701/69 |

FOREIGN PATENT DOCUMENTS 61-178232  8/1986  Japan .

*Primary Examiner*—Jacques H. Louis-Jacques
*Attorney, Agent, or Firm*—Foley & Lardner

[57] ABSTRACT

A driving-torque control system for a four-wheel-drive vehicle includes a transfer clutch employed in a transfer of the four-wheel-drive vehicle for varying a distribution ratio of driving torque between front and rear road wheels depending on a front-and-rear wheel revolution-speed difference. A calculation unit derives a command value of the engaging force of the transfer clutch from the front-and-rear wheel revolution-speed difference. A load-condition detection unit detects an input load condition of the transfer clutch, on the basis of the front-and-rear wheel revolution-speed difference and the command value of the engaging force. A comparing unit compares the input load condition detected by the load-condition detection unit with a predetermined threshold. A compensation unit compensates the engaging force of the transfer clutch so that the transfer clutch is held in a completely engaged state for a predetermined holding time duration, when the input load condition exceeds the predetermined threshold.

15 Claims, 9 Drawing Sheets

DRIVING-TORQUE CONTROL SYSTEM FOR FOUR-WHEEL-DRIVE VEHICLE

BACKGROUND OF THE INVENTION

1. Field of the Invention

The present invention relates to a four-wheel-drive control system which controls a distribution ratio of driving torque of front road wheels to rear road wheels by adjusting an engaging force of a friction clutch, for example a transfer clutch accommodated in a transfer, depending on a revolution-speed difference between the front and rear road wheels, and particularly to a system which is capable of preventing frictional heat produced by frictional contact between friction plates and friction disks, positioned alternately to form a transfer clutch of a four-wheel drive vehicle, from excessively developing.

2. Description of the Prior Art

Recently, there have been proposed and developed various four-wheel-drive control systems in which a driving-torque distribution ratio of front wheels to rear wheels can be actively controlled by way of variable adjustment of an engaging force of a friction clutch accommodated in a transfer of a four-wheel drive vehicle. In such conventional four-wheel-drive control systems, an engaging state of a friction clutch, for example a transfer clutch, would be changed from a lightly engaged state to a strongly engaged state or vice versa, in order to continuously vary a driving-torque distribution between front and rear wheels. As appreciated, there is some slip between the friction plates and the friction discs, if the friction clutch is conditioned neither in the completely engaged state nor in the clutch released state (the clutch dis-engaged state). This state of the clutch will be hereinafter referred to as a "clutch slipping-engagement state". Also, when a drive mode of the four-wheel drive vehicle is frequently changed from a four-wheel-drive mode to a two-wheel-drive mode, or vice versa, frictional heat will be excessively produced in the friction clutch. To avoid excessive development of frictional heat in the friction clutch, a Japanese Patent Provisional Publication (Tokkai Showa) No. 61-178232 teaches a friction-clutch engaging force control, depending on a temperature measured at a fritional-contact surface of a friction plate of the friction clutch employed in a four-wheel drive vehicle. In more detail, the prior art driving-force transmission device for a four-wheel-drive vehicle disclosed in the above-noted Japanese Patent Provisional Publication No. 61-178232, actually controls the engaging force (a contact pressure) of the friction clutch, such that the clutch is conditioned either in its completely engaged state or in its completely released state, when the measured temperature is above a predetermined temperature. For example, during driving of the vehicle on bad or rough roads, or on sandy or muddy roads, the engine is driven at high load and the vehicle may experience tire slip. Under such a driving condition, the friction clutch tends to slip frequently. However, when the measured temperature of the friction plate is below the predetermined temperature, the above-noted conventional system operates to continue a normal torque distribution control based on the wheel revolution-speed difference between front and rear wheels, irrespective of the frequent slipping of the friction clutch. When the measured temperature exceeds the predetermined temperature, the conventional system operates to shift the clutch from the clutch slipping engagement state to the completely engaged state or to the completely released state, so as to avoid slipping of the clutch and consequently to prevent frictional heat from being further produced in the friction clutch. In other words, the conventional system permits a temperature rise of the friction plates and the friction disks constructing the friction clutch to a considerable degree. That is, the conventional system cannot anticipatively avoid excessive development of frictional heat in the clutch. In addition, the conventional system suffers from the drawback that the normal torque distribution control cannot be executed until the measured temperature becomes less than the predetermined temperature after the predetermined temperature has been reached. Even when the normal torque distribution control is recovered, there is a possibility that the friction clutch is overheated again. As can be appreciated, the recovery time of the clutch temperature tends to become long, when ambient air temperature is excessively high, for example during the summer day time. In consideration of both the hot weather and the cold weather, it is not easy to univocally and properly preselect the above-noted predetermined temperature.

SUMMARY OF THE INVENTION

Accordingly, it is an object of the invention to provide an improved four-wheel-drive control system for a four-wheel drive vehicle (4WD) which avoids the foregoing disadvantages of the prior art.

It is another object of the invention to provide an improved four-wheel-drive control system for a 4WD is capable of anticipatively suppressing a friction clutch accommodated in a transfer of the 4WD from being overheated.

It is a further object of the invention to provide an improved four-wheel-drive control system for a 4WD which can enhance the life of a friction clutch accommodated in a transfer of the 4WD.

In order to accomplish the aforementioned and other objects of the invention, a four-wheel-drive control system in combination with a friction clutch for controlling an engaging force of the friction clutch employed in a transfer of a four-wheel drive vehicle, depending on a front-and-rear wheel revolution-speed difference between front and rear road wheels, to vary a distribution ratio of driving torque between the front road wheels and the rear road wheels, the control system comprises load-condition detection means for detecting an input load condition of the friction clutch, on the basis of the front-and-rear wheel revolution-speed difference, and compensation means for compensating the engaging force of the friction clutch so that the friction clutch is held in a completely engaged state for a predetermined holding time duration, when a high-load condition of the friction clutch is detected by the load-condition detection means.

According to another aspect of the invention, a four-wheel-drive control system for a four-wheel drive vehicle with front and rear road wheels, a first wheel of the front and rear road wheels being a main drive wheel and a second wheel of the front and rear road wheels being an auxiliary drive wheel, the control system comprises driving-torque distribution adjustment means having a friction clutch, for variably adjusting a driving-torque distribution between the main drive wheel and the auxiliary drive wheel by varying an engaging force of the friction clutch, revolution-speed difference detection means for detecting a revolution-speed difference between the main drive wheel and the auxiliary drive wheel, driving-torque distribution control means for setting the driving-torque distribution based on the revolution-speed difference, and for controlling the friction clutch on the basis of the driving-torque distribution, load-condition detection means for detecting an input load condition of the friction clutch, on the basis of the revolution-speed difference, and compensation means for compensating the engaging force of the friction clutch so that the engaging force is held at a maximum for a predetermined holding time duration, when a high-load condition is detected by the load-condition detection means.

According to a further aspect of the invention, a four-wheel-drive control system for a four-wheel drive vehicle with front and rear road wheels, a first wheel of the front and rear road wheels being a main drive wheel and a second wheel of the front and rear road wheels being an auxiliary drive wheel, the control system comprises driving-torque distribution adjustment means having a friction clutch, for variably adjusting a driving-torque distribution between the main drive wheel and the auxiliary drive wheel by varying an engaging force of the friction clutch, revolution-speed difference detection means for detecting a revolution-speed difference between the main drive wheel and the auxiliary drive wheel, driving-torque distribution control means for setting the driving-torque distribution based on the revolution-speed difference, and for controlling the friction clutch on the basis of the driving-torque distribution, load-condition detection means for detecting an input load condition of the friction clutch, on the basis of the revolution-speed difference, engaging-force compensation means for compensating the engaging force of the friction clutch so that the engaging force is held at a maximum for a holding time duration, when a high-load condition is detected by the load-condition detection means, and holding-time-duration compensation means for monitoring a state of operation of the compensation means, and for compensating the holding time duration in response to the state of operation of the compensation means.

The holding-time-duration compensation means increasingly compensates the holding time duration, when the load-condition detection means detects at least two consecutive high-load conditions, and an elapsed time, counted from a time when a first complete-engagement of the friction clutch executed by the engaging-force compensation means has terminated to a time when a subsequent complete-engagement of the friction clutch executed by the engaging-force compensation means begins, is below a preset time period. The holding time duration is reset to an initial value, when the load-condition detection means detects at least two consecutive high-load conditions, and an elapsed time, counted from a time when a first complete-engagement of the friction clutch executed by the engaging-force compensation means has terminated, is above a preset time period. Alternatively, the holding time duration may be increasingly compensated, when a number of occurrence per unit hour of complete-engagements of the friction clutch executed by the engaging-force compensation means is above a predetermined number. It is preferable that the input load condition of the load-condition detection means is based on multiplication of the wheel revolution-speed difference and a command value of the engaging force of the friction clutch which command value is derived from the wheel revolution-speed difference.

DESCRIPTION OF THE PREFERRED EMBODIMENTS

Figure 1:
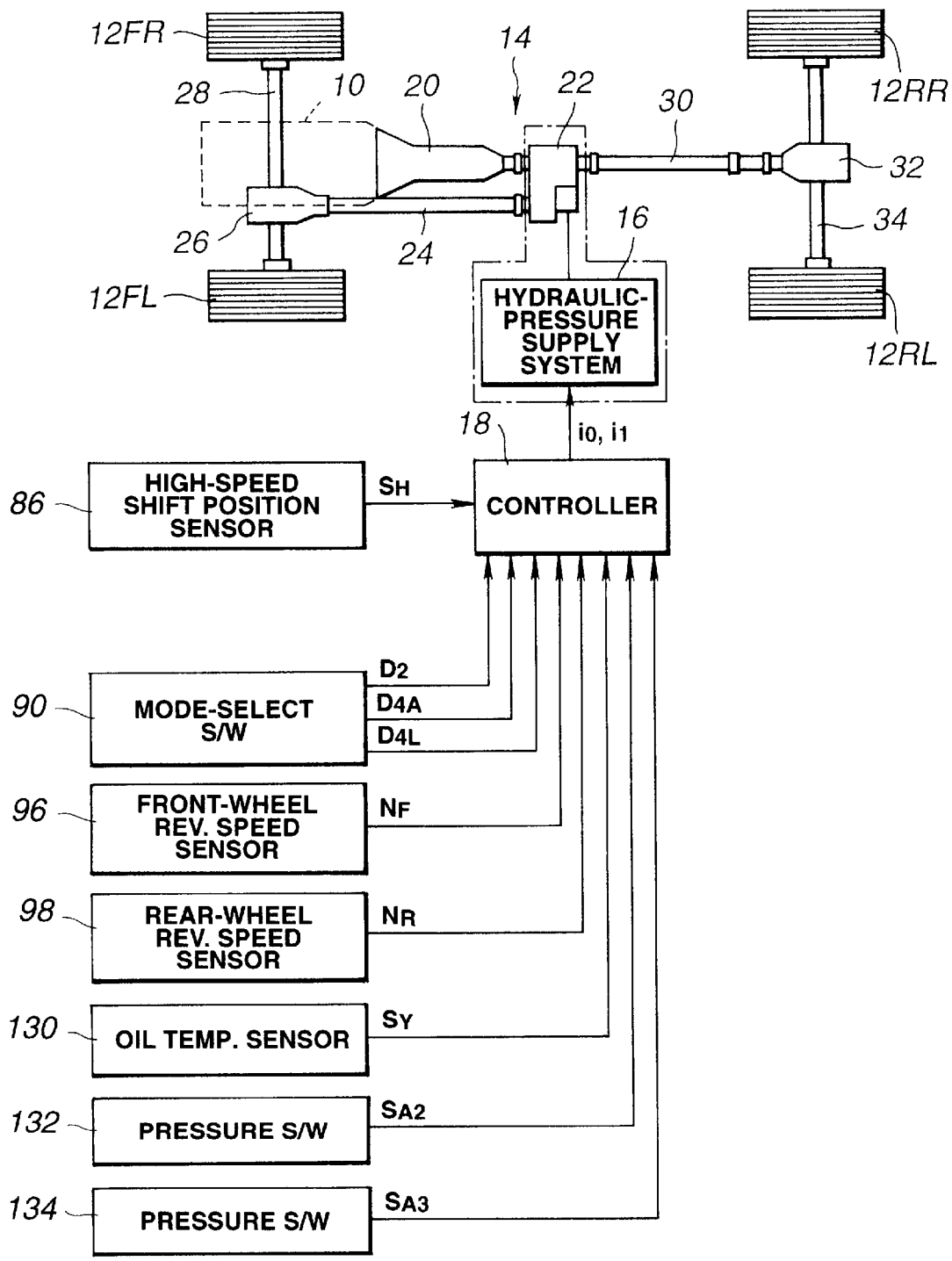
FIG. 1 is a schematic system diagram of a four-wheel drive vehicle with a four-wheel-drive control system according to the present invention.
Figure 2:
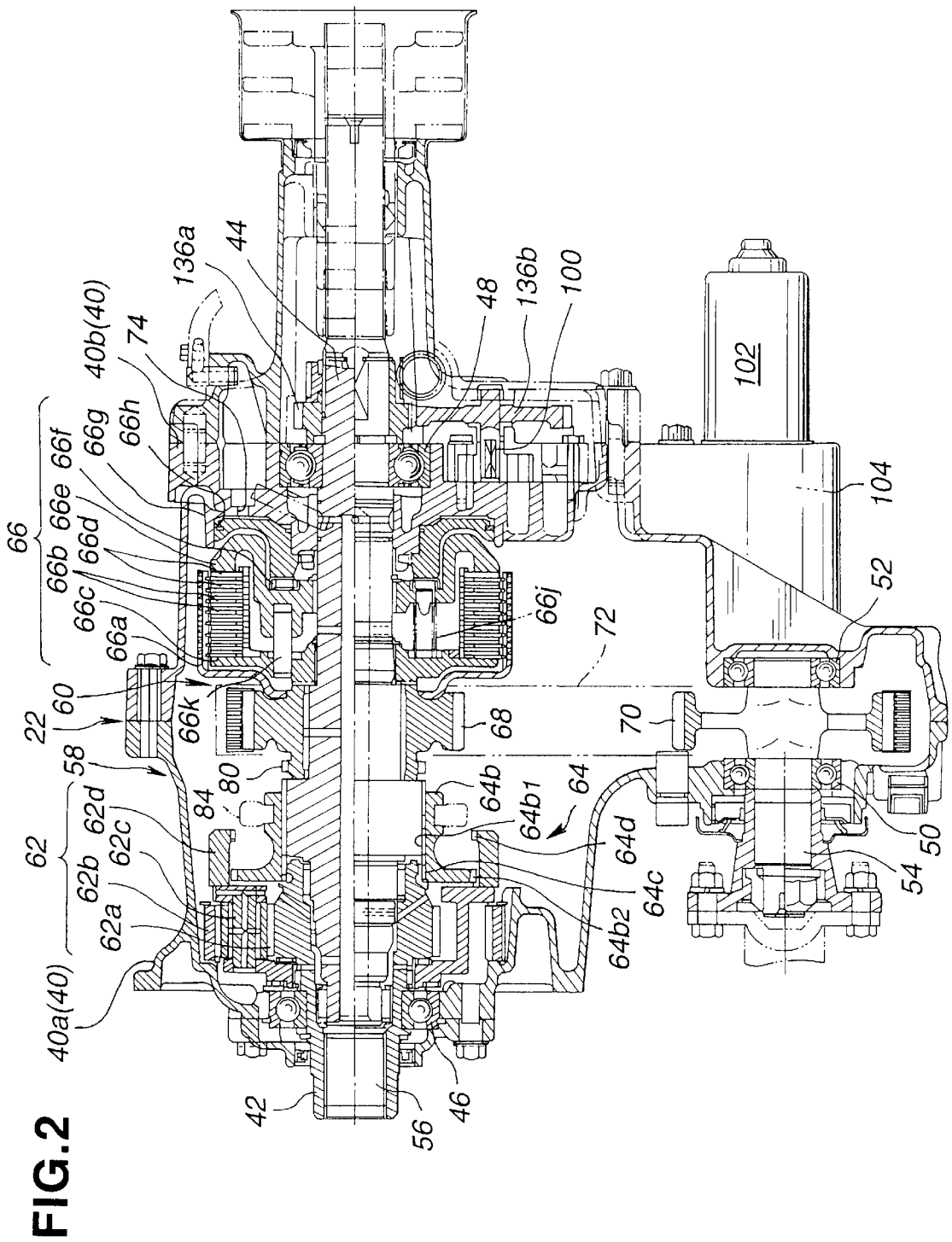
FIG. 2 is a cross-sectional view illustrating a detail of an internal structure of a transfer of the four-wheel drive vehicle shown in FIG. 1.

Referring now to the drawings, particularly to FIG. 1, the four-wheel-drive control system according to the present invention is exemplified in case of a front-engine four-wheel drive vehicle, normally operating in a basic drive mode corresponding to a rear-wheel drive mode, in which the engine power (a driving torque, produced by the engine 10 serving as a prime mover, and passing from an automatic transmission 20 to a transfer case 40) is all delivered to rear road wheels 12RL and 12RR. Each of the front road wheels 12FL and 12FR is connected to a front differential 26 by means of front drive shafts 28, while each of the rear road wheels 12RL and 12RR is connected to a rear differential 32 by means of rear drive shafts 34. Reference numeral 30 denotes a rear propeller shaft connected to the rear differential 32. The four-wheel drive vehicle includes a power train 14 by means of which a driving-torque distribution ratio between the front (12FL; 12FR) and rear (12RL; 12RR) drive wheels is changeable. As seen in FIG. 1 and FIG. 2, the power train 14 includes the automatic transmission 20 transmitting the engine power at a selected gear ratio and a transfer 22 having a transfer clutch 66 and a chain 72 transmitting the power delivered by a transfer clutch 66 accommodated in the transfer 22 to a front propeller shaft 24. A hydraulic pressure supply system 16 is provided to supply a clutch pressure PC to the transfer 22 of the power train 14. The four-wheel-drive control system of the invention also includes a controller 18.

Figure 3:
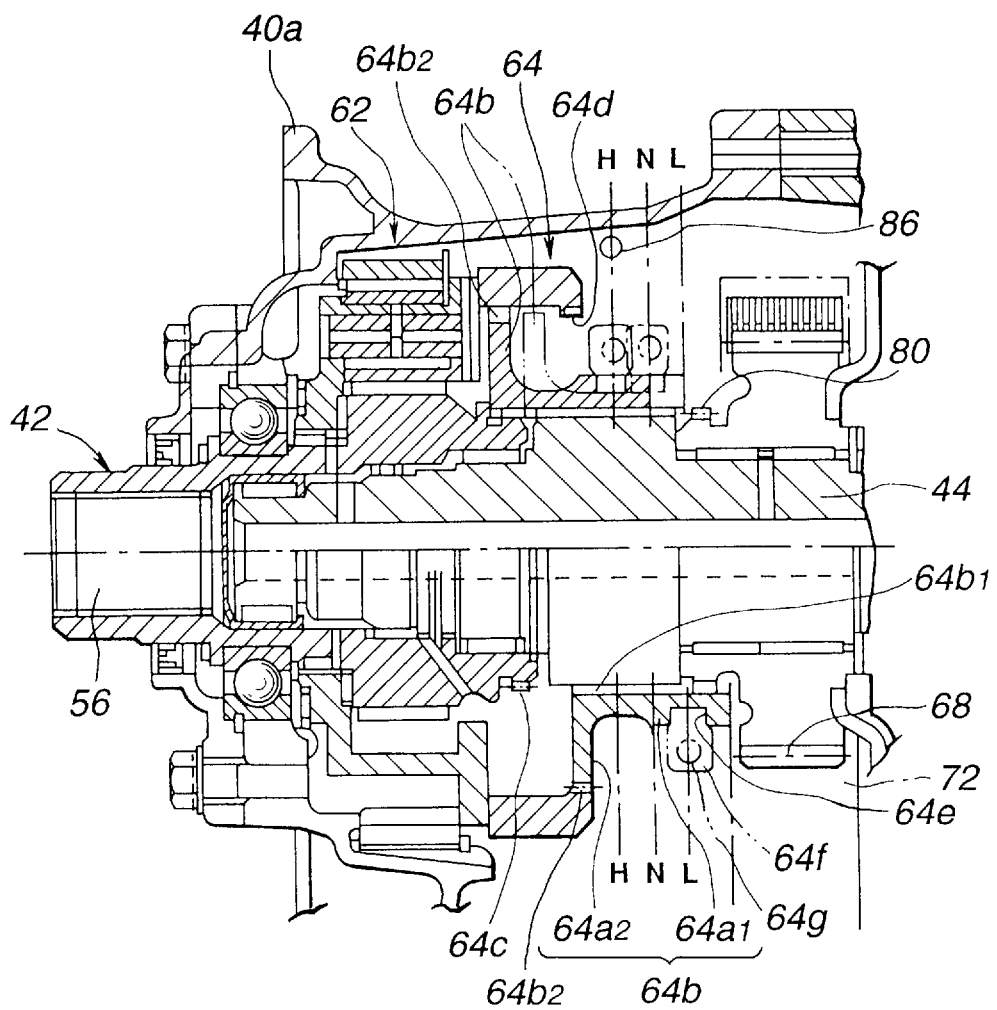
FIG. 3 is a partial cross-sectional view explaining the operation of a shift sleeve of a sub-transmission assembled in the four-wheel drive vehicle of FIG. 2.

Referring now to FIG. 2, there is shown a detailed internal structure of the transfer 22. The transfer 22 includes an input shaft 42 and a first output shaft 44, both rotatably disposed in the transfer casing 40 and coaxially arranged with each other. The input shaft 42 is rotatably supported in the front transfer casing 40a by way of a radial bearing 46, while the first output shaft 44 is rotatably supported in the rear transfer casing 40b by way of a radial bearing 48. The output shaft 42 is separated from the first output shaft 44 to ensure a relative rotation between the two shafts 42 and 44. The transfer 22 also includes second output shaft 54 rotatably supported by means of a pair of radial bearings 50 and 52, so that the central axis of the second output shaft 54 is parallel with the central axis of the first output shaft 44. As seen in FIG. 2, the bearing 50 is firmly fitted to the front transfer casing 40a, while the bearing 52 is firmly fitted to the rear transfer casing 40b. The input shaft 42 is firmly connected to the output shaft 56 of the transmission 20 to receive the power passing through the transmission 20, the first output shaft 44 is connected to the rear propeller shaft 30 through a universal joint (not numbered), and the second output shaft 54 is connected to the front propeller shaft 24 through a universal joint (not numbered). The transfer 22 includes a sub-gearchange mechanism 58 and a two-wheel-drive/four-wheel-drive switching mechanism 60. As seen in FIG. 2, the two mechanisms 58 and 60 are operably provided on the outer periphery of the input shaft 42 and the first output shaft 44. The sub-gearchange mechanism 58 comprises a planetary-gear mechanism 62 and a dog-clutch type high-speed/low-speed switching mechanism 64, coaxially arranged with each other. As seen in FIG. 2, the planetary-gear mechanism 62 is comprised of a sun gear 62a formed on the outer periphery of the input shaft 42, an internal gear 62b firmly fitted into the inner peripheral wall of the front transfer casing 40a, a planet-pinion gear 62c in meshed engagement with both the sun gear 62a and the internal gear 62b, and a pinion carrier 62d rotatably supporting the pinion gear 62c. On the other hand, the high-speed/low-speed switching mechanism 64 is comprised of a shift sleeve 64b, a high-speed shift gear 64c and a low-speed shift gear 64d. The shift sleeve 64b has a substantially cylindrical portion 64a1 formed with an internal toothed portion 64b1 and a flanged portion 64a2 formed with an external toothed portion 64b2. The shift sleeve 64b is splined to a plurality of key grooves formed on the outer periphery of the first output shaft 44 by means of the internal toothed portion 64b1, so that the shift sleeve 64b is slidable in its axial direction. As seen in FIG. 3, the shift sleeve 64b is formed with a substantially annular outer peripheral groove 64e at its cylindrical portion 64a1. A fork 64g is engaged with the groove 64e. Reference numeral 64f denotes a fork rod integrally formed with the fork 64g. The fork rod 64f is mechanically linked through a linkage (not shown) to a gearchange lever of the sub-gearchange mechanism 58 by way of which lever the four-wheel-drive high-speed shift position H (4H range), the neutral position N (N range), and the four-wheel-drive low-speed shift position L (4L range) can be selected in that order, for example. The high-speed shift gear 64c is formed on the outer periphery of the input shaft 42 so that the shift gear 64c is brought into meshed engagement with the internal toothed portion 64b1 by way of a leftward axial sliding movement (viewing FIG. 3) of the shift sleeve 64b. As indicated by the solid line in the upper half of FIG. 3, when selecting the 4H range by the sub-gearchange lever, that is, when the shift sleeve 64b moves to the high-speed shift position H (the leftmost position), the high-speed shift gear 64c comes into meshed engagement with the internal toothed portion 64b1. In the high-speed shift position H, the driving torque transmitted to the input shaft 42 is transferred directly to the first output shaft 44. The low-speed shift gear 64d is formed on the inner periphery of the pinion carrier 62d so that the shift gear 64d is brought into meshed engagement with the external toothed portion 64b2 by way of a rightward axial sliding movement of the shift sleeve 64. As indicated by the phantom line in the lower half of FIG. 3, when the shift sleeve 64b is shifted from the high-speed shift position H through the neutral position N to the low-speed shift position (the rightmost position), the low-speed shift gear 64d comes into meshed engagement with the external toothed portion 64b2 and additionally the internal toothed portion 64b1 is engaged with an additional gear 80 of a first sprocket 68 described later. As indicated by the phantom line in the upper half of FIG. 3, when the shift sleeve 64b is held at the neutral position N substantially midway between the high-speed shift position H and the low-speed shift position L, the shift sleeve 64b is held in the disengaged state in which the internal toothed portion 64b1 is disengaged from the high-speed shift gear 64c and also the external toothed portion 64b2 is disengaged from the low-speed shift gear 64d. The sliding motion of the shift sleeve 64b is produced by way of the fork 64g. In FIG. 3, only the end of the fork 64g is shown.

Returning to FIG. 2, the two-wheel-drive/four-wheel-drive switching mechanism 60 includes a wet multiple-disc friction clutch 66, called the transfer clutch, the first sprocket 68, the second sprocket 70 and the chain 72. As seen in FIG. 2, the part-time four-wheel drive vehicle employing the transfer 22 equipped with the transfer clutch 66 is generally known as an "active torque-split four-wheel drive vehicle". In such an active torque-split four-wheel drive vehicle, a distribution ratio of driving torque of front wheels to rear wheels is actively controlled by variably adjusting an engaging force of the transfer clutch 66 via a controlled clutch pressure PC produced by the hydraulic pressure supply system 16 detailed later. The first sprocket 68 is rotatably supported on the first output shaft 44. The second sprocket 70 is fixedly connected to the second output shaft 54 so that the second sprocket 70 and the second output shaft 54 are coaxially arranged with each other. The second sprocket 70 has a driven connection with the first sprocket 68 through the chain 72. The transfer clutch 66 includes a clutch drum 66a fixedly connected to the first sprocket 68, a plurality of friction plates 66b splined to the clutch drum 66a, a clutch hub 66c splined onto the outer periphery of the first output shaft 44, a plurality of friction disks 66d integrally connected onto the clutch hub 66c and interleaved with the friction plates 66b, a rotary member 66e disposed close to the outer periphery of the first output shaft 44 for frictional contact between the friction plates 66b and the friction disks 66d, a guide pin 66k connected integral with the clutch hub 66c for ensuring the axial sliding motion of the rotary member 66e, a clutch piston 66g slidably accommodated in a cylinder chamber 66h defined in the inner wall portion of the rear transfer casing 40b for causing the above-mentioned frictional contact, a thrust bearing 66f interleaved between the rotary member 66e and the clutch piston 66g for transmitting the axial sliding motion of the piston 66g to the rotary member 66e, and a return spring 66j biasing the rotary member 66e toward the clutch piston 66g.

Figure 6:
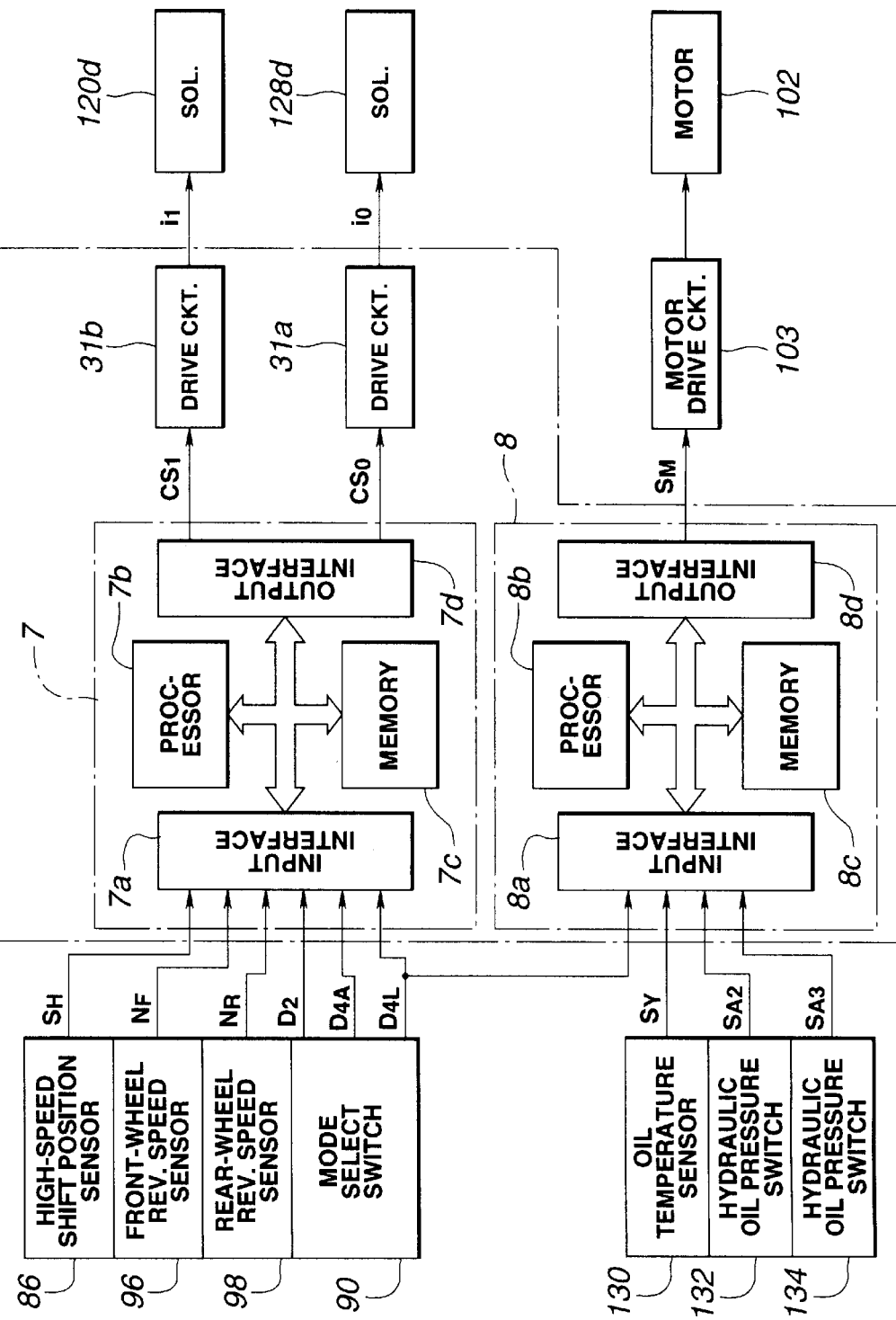
FIG. 6 is a block diagram illustrating a controller for a four-wheel-drive control executed by the system of the present invention.

The clutch pressure PC from hydraulic pressure supply system 16 is fed into an inlet port 74 which is formed in the rear transfer casing 40b and communicates with the cylinder chamber 66h. When the hydraulic pressure of the cylinder chamber 66h is increased owing to the incoming clutch pressure PC, the clutch piston 66g moves leftward (viewing FIG. 2). The leftward sliding motion of the clutch piston 66g is transmitted through the thrust bearing 66f to the rotary member 66e and thus the friction disks 66d abut the friction plates 66b, with the result that the friction plates 66b come into frictional contact with the friction disks 66d. The degree of the frictional engagement, i.e., the magnitude of the clutch engaging force, is dependent on the incoming clutch pressure PC. In this manner, the driving torque passing from the first output shaft 44 can be transmitted through the first sprocket 68, the chain 72 and the second sprocket 70 to the second output shaft 54, at a desired driving-torque distribution ratio depending on the engaging force of the transfer clutch 66. In contrast to the above, owing to the decreased clutch pressure PC, when the rotary member 66e and the clutch piston 66g are placed at their rightmost positions (viewing FIG. 2) by way of the bias of the return spring 66j, the friction plates 66b are held in axially spaced relationship with the friction disks 66d, and thus the power coming from the first output shaft 44 is not transmitted to the second output shaft 54. As seen in FIG. 2, the first sprocket 68 is integrally formed with an additional external gear 80, called a four-wheel-drive gear, which is engageable with the internal toothed portion 64bi of the shift sleeve 64b. The additional gear 80 is designed to be meshed with the internal toothed portion 64b1, simultaneously when the shift sleeve 64b moves to the low-speed shift position L shown in FIG. 3 and the external toothed portion 64b2 of the shift sleeve 64b is meshed with the low-speed shift gear 64d of the pinion carrier 62d. That is, the shift sleeve 64b; and the additional gear 80 are cooperative with each other to construct a dog clutch through which the first output shaft 44 is forcibly connected to the second output shaft 54 at the low-speed shift position L. As previously described, the shift sleeve 64b is moved axially from one of the high-speed shift position H, the neutral position N, and the low-speed shift position L to the other, through the fork 64g by manually operating the sub-gearchange lever (not shown). As seen in FIG. 3, a high-speed shift position sensor 86 is provided to detect that the shift sleeve 64b is shifted to the high-speed shift position H, and to generate a high-speed shift position indicative signal SH representing that the shift sleeve 64b is held at the high-speed shift position H. As seen in FIG. 6, the signal SH is input into the controller 18, as explained later.

Figure 4:
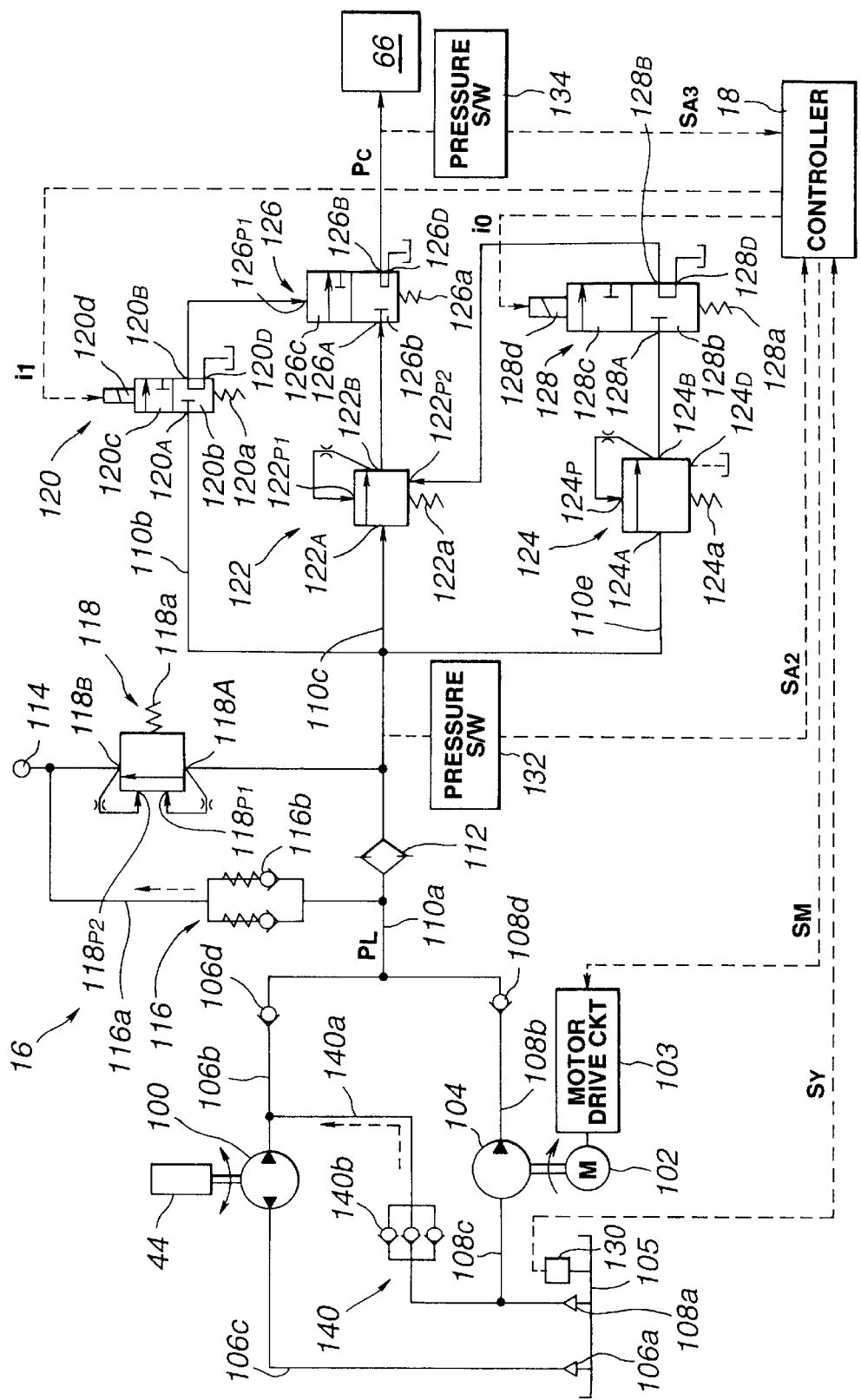
FIG. 4 is a block diagram illustrating a hydraulic-pressure supply circuit generating a clutch pressure for a transfer clutch employed in the four-wheel drive vehicle of FIG. 2.

Referring now to FIG. 4, there is shown a detail of the hydraulic pressure supply system 16. The hydraulic pressure supply system 16 includes a two-directional flow type reversible pump 100 having a driven connection with the input shaft 42 connected to the output shaft 56 of the transmission 20, and a single directional flow type hydraulic oil pump 104 arranged in parallel with the pump 100 and having a driven connection with an electric motor 102. The former pump 100 will be hereinafter referred to as a "main pump", while the latter pump 104 will be hereinafter referred to as a "sub-pump". The sub-pump 104 is provided to function as an auxiliary oil pressure source, in the event that there is less line pressure produced by the main pump 100. As seen in FIG. 4, the main pump 100 suctions working fluid (hydraulic oil) from an oil reservoir 105 through an oil strainer 106a and an oil suction line 106c, and feeds the clean hydraulic oil to an oil delivery line 106a, while the sub-pump 104 suctions hydraulic oil from the reservoir 105 through another oil strainer 108a and an oil suction line 108c, and feeds the clean hydraulic oil to an oil delivery line 108a. Each strainer is provided to prevent dirt and other large particles from entering the pump. A check valve 106d is fluidly disposed in the oil delivery line 106b to prevent back flow of the hydraulic oil to the outlet port of the main pump 100. Similarly, a check valve 108d is fluidly disposed in the oil delivery line 108b to prevent back flow of the hydraulic oil to the outlet port of the sub-pump 104. The two oil delivery lines 106b and 108b are converged to a sole oil supply line 110a. An oil element 112 is fluidly disposed in the oil supply line 110a to remove any impurities from the incoming oil. Upstream of the oil element 112, the oil supply line 110a is fluidly connected to an inlet port of a relief oil passageway 116. The outlet port of the relief oil passageway 116 communicates with an oil lubricating system 114. Downstream of the oil element 112, the oil supply line 110a is connected to a line-pressure regulating valve 118. The line-pressure regulating valve 118 is provided to regulate the pressurized hydraulic oil passing from the oil supply line 110a to a predetermined line pressure PL. The oil supply line 110a is divided into three branch lines, namely a first branch line 110b connected to an inlet port of an electromagnetic solenoid type directional control valve 120, a second branch line 110c connected to an inlet port of a clutch pressure control valve 122, and a third branch line 110e connected to an inlet port of a pressure reducing valve 124. The outlet port of the clutch pressure control valve 122 is connected to the inlet port of an external pilot-operated directional control valve 126. The outlet port of the pilot-operated directional control valve 126 is connected to the inlet port 74 of the transfer casing to supply the clutch pressure PC to the transfer clutch 66 in response to a pilot pressure based on a control signal ii produced by the controller 18. On the other hand, the outlet port of the pressure reducing valve 124 is connected to the inlet port of a duty-ratio controlled electromagnetic solenoid valve 128 which supplies an external pilot pressure to the clutch pressure control valve 122. Reference numeral 130 denotes an oil temperature sensor provided in the oil reservoir 105 for detecting a temperature of working fluid. Reference numeral 132 denotes a hydraulic pressure switch which is connected to the oil supply line 110a just before the junction of the supply line 110a and the branch lines (110b; 110c; 110e), for detecting the hydraulic oil pressure decreasingly regulated by the line-pressure regulating valve 118. Reference numeral 134 denotes a hydraulic pressure switch which is connected to a clutch pressure delivery line communicating the outlet port of the pilot-operated directional control valve 126, for detecting the clutch pressure PC to be delivered to the transfer clutch 66. In the shown embodiment, the main parts constructing the oil pressure supply system 16 are disposed in the transfer 22. As seen in FIG. 2, the main pump 100 is provided in the vicinity of the radial bearing 48 so that the main pump 100 is driven by the first output shaft 44 by means of a first gear 136a and a second gear 136b. On the other hand, the sub-pump 104 is connected to the electric motor 102 attached to the outside wall of the transfer casing (transfer rear casing 40b). In FIG. 4, a by-pass circuit 140 is fluidly disposed between the oil delivery line 106b of the main pump 100 and the oil suction line 108c of the sub-pump 104. The by-pass circuit 140 includes a bypass line 140a and three check valves 140b being parallel to each other and fluidly disposed in the bypass line 140a. The by-pass circuit 140 is provided to supply the hydraulic oil from the suction line 108c to the delivery line 16b in the direction indicated by the broken line with the three check valves 140b opened, when the hydraulic pressure in the delivery line 106b is reduced substantially to vacuum.

Figure 5:
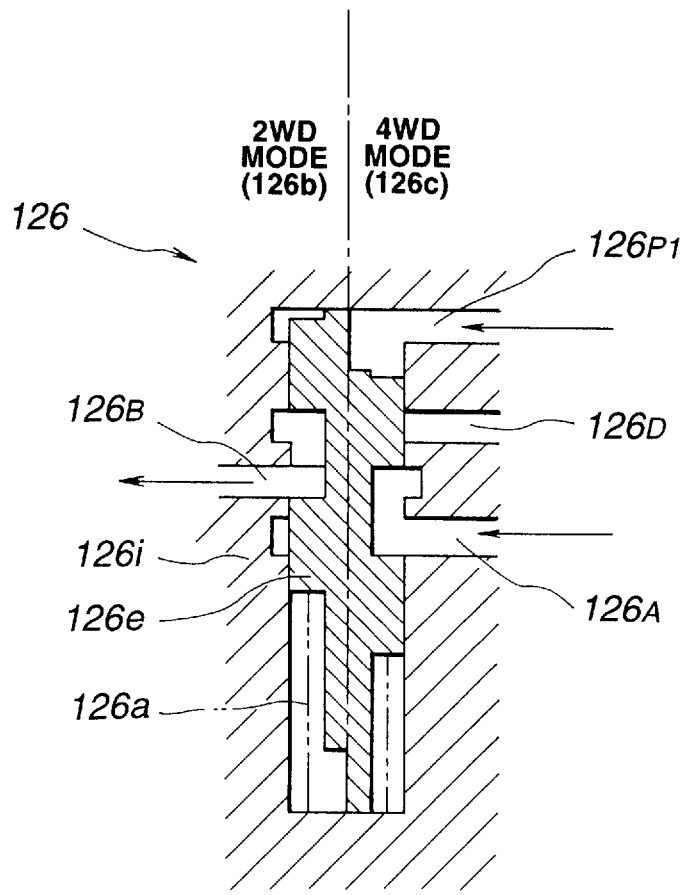
FIG. 5 is a cross-sectional view explaining the operation of a pilot-operated switching valve assembled in the hydraulic-pressure supply circuit shown in FIG. 4.

The relief oil passageway 116 includes a relief line 116a disposed between the upstream line of the oil element 112 and the inlet of the oil lubricating system 114, and a pair of spring-loaded ball check valves 116b, set in parallel. The relief oil passageway 116 acts to relieve the high-pressure hydraulic oil to the lubricating system 114 with the check valves opened in the direction indicated by the broken line, when the pressure level of the pressurized hydraulic oil exceeds a predetermined high-pressure level just upstream of the oil element 112, owing to clogging of the element 112. As seen in FIG. 4, the line pressure regulating valve 118 consists of an internal-pilot operated, spring-offset type pressure reducing valve. The line pressure regulating valve 118 has an inlet port 118A connected to the supply line 110a, an outlet port 118B connected to the inlet of the lubricating system 114, a first internal pilot port 118P1 receiving a primary pressure thereinto through a fixed orifice, a second internal pilot port 118P2 receiving a secondary pressure from the outlet port 118B thereinto through a fixed orifice, a spool slidably disposed in the valve housing of the pressure regulating valve 118, and a return spring 118a biasing the spool in one axial direction. Also, supplied to the lubricating system 114 is the superfluous hydraulic oil discharged from the outlet port 118B of the line pressure regulating valve 118 after regulating the pressurized hydraulic oil passing through the supply line 110a at a predetermined pressure level. The clutch pressure control valve 122 consists of an internal- and external-pilot operated, spring-offset pressure regulating valve. The clutch pressure control valve 122 includes an inlet port 122A connected to the branch line 110c, an outlet port 122B connected to the inlet of the pilot operated directional control valve 126, an internal pilot port 122P1 receiving a secondary pressure from the outlet port 122B thereinto through a fixed orifice as a pilot pressure, an external pilot port 122P2 receiving a controlled pressure generated by the duty-ratio controlled electromagnetic solenoid valve 128, a spool slidably disposed in the valve housing of the clutch pressure control valve 122, and a return spring 122a biasing the spool to one axial direction. The clutch pressure control valve 122 is responsive to the controlled pressure generated from the duty-ratio controlled solenoid valve 128, in such a manner as to establish a full fluid communication between the inlet and outlet ports 122A and 122B in the presence of the controlled pressure generated from the solenoid valve 128. The secondary pressure discharged from the outlet port 122B of the pressure control valve 122 is output to the directional control valve 126 as a clutch pressure PC. In contrast, in the absence of the controlled pressure to be generated from the solenoid valve 128, the pressure control valve 122 operates to block the fluid communication between the inlet and outlet ports 122A and 122B. The pressure reducing valve 124 consists of an internal-pilot operated, spring-offset, constant secondary-pressure type pressure reducing valve. The pressure reducing valve 124 includes an inlet port 124A connected to the branch line 110e, an outlet port 124B connected to the inlet of the duty-ratio controlled solenoid valve 128, an internal-pilot port 124P receiving a secondary pressure from the outlet port 124B thereinto through a fixed orifice, a drain port 124D, and a spool slidably disposed in the valve housing of the reducing valve 124, and a return spring 124a biasing the spool to one axial direction. By way of a proper sliding movement of the spool, based on the pilot pressure (the secondary pressure from the outlet port 124B) fed into the pilot port 124P, the primary pressure coming from the inlet port 124A is decreasingly adjusted to a proper decreased pressure level. The properly reduced hydraulic pressure is supplied from the pressure reducing valve 124 to the inlet port 128A of the duty-ratio controlled solenoid valve 128. The duty-ratio controlled electromagnetic solenoid valve 128 consists of a three-port, two-position electromagnetic solenoid valve. The duty-ratio controlled solenoid valve 128 includes the inlet port connected to the outlet port 124B of the pressure reducing valve 124, a drain port 128D, an outlet port 128B connected to the external-pilot port 122P2 of the clutch pressure control valve 122, a spool slidably disposed in the valve housing of the solenoid valve 128, a return spring 128a biasing the spool to one axial direction, and an electromagnetic solenoid 128d. The solenoid valve 128 is so designed that its valve position is switchable between a normal position 128b wherein a fluid communication between the outlet port 128B and the drain port 128D is established, and a solenoid-actuated position 128c wherein a fluid communication between the inlet and outlet ports 128A and 128B is established. The solenoid valve 128 is responsive to a desired duty-cycle controlled exciting current i0 supplied from the controller 18 in the form of a rectangular pulse signal having a duty cycle determined by the controller. As is generally known, in case of the duty-ratio controlled solenoid valve, a high-level exciting current and a low-level exciting current are repeatedly supplied to the solenoid 128d at a desired duty cycle determined by the controller 18, with the result that the ratio of a time duration of the valve open state and a time duration of the valve closed state is desirably controlled in accordance with the duty ratio and thus the controlled pilot pressure output from the solenoid valve 128 to the clutch pressure control valve 122 can be varied depending on the duty ratio. As appreciated, the pressure level of the clutch pressure PC generated from the pressure control valve 122 can be suitably adjusted depending on the controlled pilot pressure fed into the pilot port 122P2. Depending on the pressure level of the clutch pressure PC adjusted, the engaging force of the transfer clutch 66 is also adjusted properly. That is, the driving-torque distribution ratio of the front wheels to the rear wheels is determined by the clutch pressure PC, i.e., the duty-cycle controlled exciting current i0 produced by the controller 18. The spring-offset type electromagnetic directional control valve 120 consists of a three-port, two-position electromagnetic solenoid valve. The directional control valve 120 includes an inlet port 120A connected to the branch line 110b, an outlet port 120B connected to the external pilot port 126P1 of the pilot-operated directional control valve 126, a drain port 120D, a spool slidably disposed in the valve housing of the directional control valve 120, a return spring 120a biasing the spool to one axial direction, and an electromagnetic solenoid 120d. The directional control valve 120 is so designed that its valve position is switchable between a normal position 120b wherein a fluid communication between the outlet port 120B and the drain port 120D is established, and a solenoid-actuated position 120c wherein a fluid communication between the inlet and outlet ports 120A and 120B is established and the fluid communication between the outlet port 120B and the drain port 120D is blocked. Note that the directional control valve 120 is controlled by an ON-OFF control but not the above-noted duty-ratio control. That is, the directional control valve 120 is activated or de-activated in response to a current level of the exciting current i1 generated from the controller 18 to the solenoid 120d. When the current i1 of a comparatively high current level is supplied to the solenoid 120d, the valve 120 is activated and thus its valve position is shifted to the solenoid-activated position 120c to establish the fluid communication between the inlet and outlet ports 120A and 120B. Under this condition, the line pressure PL is supplied through the directional control valve 120 to the external pilot port 126P1 of the pilot-operated directional control valve 126. When the low-current or less current i1 is supplied to the solenoid 120d, the valve 120 is de-activated and thus its valve position is held at the normal position 120b to block the fluid communication between the two ports 120A and 120B. Under this condition, the hydraulic oil supplied to the pilot port 126P1 is quickly drained through the drain port 120D to the reservoir to extinguish the pilot pressure applied to the pilot-operated directional control valve 126. As seen in FIGS. 4 and 5, the pilot-operated directional control valve 126 consists of a three-port, two-position spring-offset type spool valve. The spool valve 126 includes an inlet port 126A connected to the outlet port 122B of the clutch pressure control valve 122, an outlet port 126B connected to the inlet port 74 of the transfer clutch 66, an external pilot port 126P1 connected to the outlet port 120B of the directional control valve 120, a drain port 126D, a spool 126e slidably disposed in the valve housing 126i of the spool valve 126, and a return spring 126a biasing the spool 126e to one axial direction (the uppermost position in FIG. 5). In the absence of the pilot pressure to be supplied into the external pilot port 126P1, as shown in the left half of FIG. 5, the spool 126e is held at the uppermost position (a 2WD-mode position 126b) by way of the bias of the spring 126a, with the result that a fluid communication between the inlet and outlet ports 126A and 126B is blocked and the outlet port 126B is communicated with the drain port 126D, that is, there is no supply of the clutch pressure PC to the transfer clutch 66. Conversely, when the solenoid 120d of the directional control valve 120 is activated by the exciting current ii of a high-current level, and thus the pilot pressure is supplied via the valve 120 to the external pilot port 126P1, as shown in the right half of FIG. 5, the spool 126e is shifted to the lowermost position (a 4WD-mode position 126c) against the bias of the spring 126a by way of the pilot pressure introduced into the pilot port 126P1, with the result that a fluid communication between the inlet and outlet ports 126A and 126B is established, that is, the clutch pressure PC based on the duty ratio determined by the controller 18 is supplied through the pilot-operated directional control valve 126 to the transfer clutch 66. As can be appreciated, since the sliding motion of the spool 126e slidably accommodated in the pilot-operated directional control valve 126 is controlled by the pilot pressure of a comparatively high pressure level essentially equal to a pressure level of the line pressure PL, the pilot pressure of a high pressure level can ensure a smooth sliding motion of the spool 126e, even when there is an increased sliding resistance of the spool 126e due to undesired debris or dust which would be caused by friction between the outer sliding surface of the spool 126e and the inner wall surface of the valve housing.

A mode-select switch 90 is also provided in the vicinity of the driver seat of the vehicle, for selecting the drive mode of the four-wheel drive vehicle. In more detail, the mode-select switch is provided to switch from one of three modes to another of the three modes. A first mode is a two-wheel-drive mode wherein the power (driving torque) is all delivered to the rear wheels, a second mode is a four-wheel-drive auto-mode wherein the driving torque distribution of the front wheels to the rear wheels is variably adjustable among 0% to 50%, depending on the wheel revolution-speed difference $\Delta N$ between the front and rear wheels, and a third mode is a four-wheel-drive lock-mode wherein the transfer clutch 66 is held in the completely engaged state and thus the driving torque distribution is maintained at 50%. Depending on the selected mode, the mode-select switch 90 selectively switches either one of a two-wheel-drive mode selection signal D2, a four-wheel-drive auto-mode selection signal D4A and a four-wheel-drive lock-mode selection signal D4L at a high signal level (an ON state). For example, when the two-wheel-drive mode is selected, the signal D2 is changed at a high signal level (an ON state), and the other signals D4A and D4L are held at a low signal level (an OFF state). These selection signals D2, D4A and D4L are input into the controller 18.

A front-wheel revolution-speed sensor 96 is provided at the second output shaft 54 for detecting revolution speeds of the second output shaft 54. In the shown embodiment, the front-wheel revolution-speed sensor 96 essentially corresponds to an auxiliary drive wheel revolution-speed sensor which detects a mean revolution-speed of the auxiliary drive wheels (the front-left and front-right wheels 12FL and 12FR). On the other hand, a rear-wheel revolution-speed sensor 98 is provided at the input shaft 42 of the sub-gearchange mechanism 58 for detecting revolution speeds of the input shaft 42. The rear-wheel revolution-speed sensor 98 essentially corresponds to a main drive wheel revolution-speed sensor which detects a mean revolution-speed of the main drive wheels (the rear-left and rear-right wheels 12RL and 12RR). The controller 18 receives a front-wheel revolution-speed indicative signal NF from the sensor 96 and a rear-wheel revolution-speed indicative signal NR from the sensor 98. Ordinarily used as the rear-wheel revolution-speed sensor 98 is a revolution-speed sensor which is usually attached to the output shaft of the automatic transmission for detecting revolution speeds of the output shaft 56 of the automatic transmission so as to provide one of various parameters required for automatically controlling the automatic transmission.

Returning to FIG. 1, the controller 18 receives various signals, namely the high-speed shift position indicative signal SH from the high-speed shift position sensor 86, the selection signals D2, D4A and D4L from the mode-select switch 90, the front-wheel revolution-speed indicative signal NF from the auxiliary drive wheel revolution-speed sensor 96, the rear-wheel revolution-speed indicative signal NR from the main drive wheel revolutions-speed sensor 98, an oil temperature indicative signal SY from the oil temperature sensor 130, a line-pressure indicative signal SA2 from the pressure switch 132 and a clutch pressure indicative signal SA3 from the pressure switch 134. As hereinafter described in detail, the controller 18 generates the above-noted exciting currents i0 and i1, based on the signals SH, D2, D4A, D4L, NF and NR. On the basis of the signals SY, SA2 and SA3, the controller 18 generates a motor control signal SM to execute a line-pressure hold control according to which the line pressure PL is maintained constant., as seen in FIG. 4.

Referring now to FIG. 6, there is shown a detailed structure of the controller 18 including a microcomputer 7 provided for the above-noted driving-torque distribution control, another microcomputer 8 provided for the above-noted line-pressure hold control, a drive circuit 31a responsive to a control signal CS0 from the microcomputer 7 for outputting the exciting current i0 correlated to the duty ratio D determined for the solenoid 128d of the duty-ratio controlled electromagnetic valve 128, a drive circuit 31b responsive to a control signal CS1 from the microcomputer 7 for outputting the exciting current i1 to the solenoid 120d of the directional control valve 120, and a motor drive circuit 103 which adjusts a rotational speed of the motor 102 by way of chopping control, depending on the control signal SM which signal is produced by the microcomputer 8 and based on a control parameter such as a vehicle speed. Actually, the microcomputer 8 is responsive to the vehicle speed in order to output the control signal SM to the motor drive circuit 103 for subsidiarily driving the motor 102 having a driving connection with the sub-pump 104, and thus ensuring a predetermined line pressure PL, in the event that, on the basis of the signal from the hydraulic pressure switch 132, the controller 18 determines that a hydraulic oil pressure of the pressurized working fluid produced by the main pump 100 is insufficient. In more detail, the microcomputer 8 executes the line-pressure hold control when the line pressure PL detected by pressure switch 132 is below a predetermined pressure level, in such a manner as to determine the magnitude of the control signal SM on the basis of both the vehicle speed and the oil temperature indicative signal SY from the sensor 130, and to properly control the rotational speed of the sub-motor 102, thereby maintaining the line pressure PL at a predetermined pressure level. In the case that the clutch pressure PC detected by the pressure switch 134 is held at an excessively low pressure level such as zero even when the four-wheel-drive lock-mode (D4L) is selected, the microcomputer 8 operates to generate a warning signal indicating that the pilot-operated directional control valve 126 malfunctions.

As seen in FIG. 6, the microcomputer 7 consists of an input interface 7a such as an input interface circuit, an arithmetic processor 7b, a memory 7c such as a read only memory (ROM) and a random access memory (RAM), and an output interface 7d such as an output interface circuit. Actually, the input interface 7a receives the signals SH, D2, D4A, D4L, NF and NR, while the output interface 7d outputs the control signal CS0 to the drive circuit 31a so as to output the duty-cycle controlled exciting current i0 to the solenoid 128d, and also outputs the control signal CS1 to the drive circuit 31b so as to output the ON/OFF signal i0 to the solenoid 120d. Actually, the control signal CS0 is an analog voltage signal representative of the duty ratio D correlated with a target driving torque ΔT delivered to the front wheels 12FL and 12FR, which target torque is determined by the arithmetic processor 7b in accordance with a predetermined arithmetic processing (See FIG. 10) on the basis of the signals SH, D2, D4A, D4L, NF and NR. For the above reasons, the drive circuit 31 a includes a pulse-width modulator for modulating the control signal CS0 consisting of the analog signal to the duty-cycle controlled exciting current io of the determined duty ratio D. The memory 7c stores predetermined torque characteristics illustrated in FIGS. 7 to 9 in the form of data map. The memory 7c also stores a program necessary for the control procedure executed by the arithmetic processor 7b and temporarily stores results of calculation, obtained through the control routine shown in FIG. 10.

Figure 7:
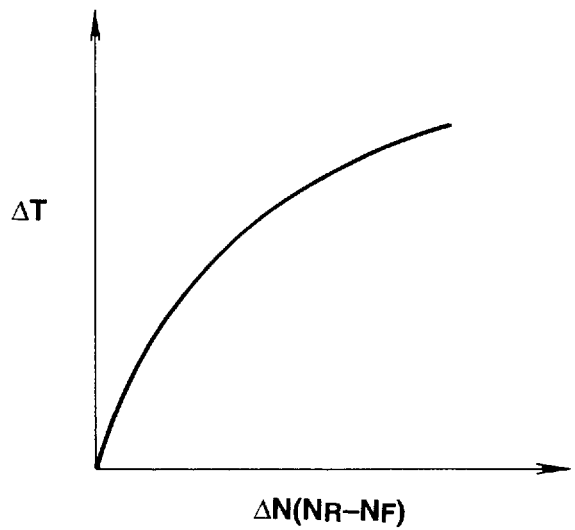
FIG. 7 is a graph illustrating a relationship between a front-and-rear wheel revolution-speed difference $\Delta N$ and a wheel-speed difference dependent driving torque $\Delta T$ to be delivered to the front axle.

Referring to FIG. 7 there is shown the front-and-rear wheel speed difference ΔN versus wheel-speed difference dependent front-wheel side driving torque AT (corresponding to the target torque delivered to the front axle) characteristic. As can be appreciated from the characteristic curve indicated in FIG. 7, the target torque delivered to the front wheels increases in a non-linear fashion in accordance with an increase in the wheel speed difference ΔN=(NR−NF).

Figure 8:
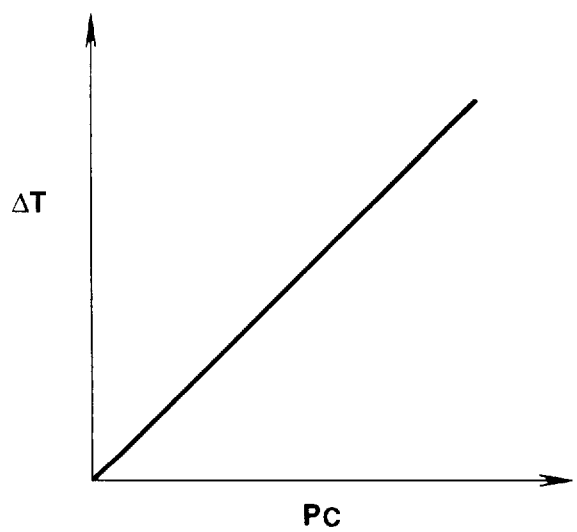
FIG. 8 is a graph illustrating a relationship between a clutch pressure PC and the driving torque $\Delta T$.

Referring to FIG. 8, there is shown the clutch pressure PC versus target torque ΔT characteristic. As seen in FIG. 8, the target torque to be delivered to the front wheels is varied in a linear fashion in accordance with an increase in the clutch pressure PC.

Figure 9:
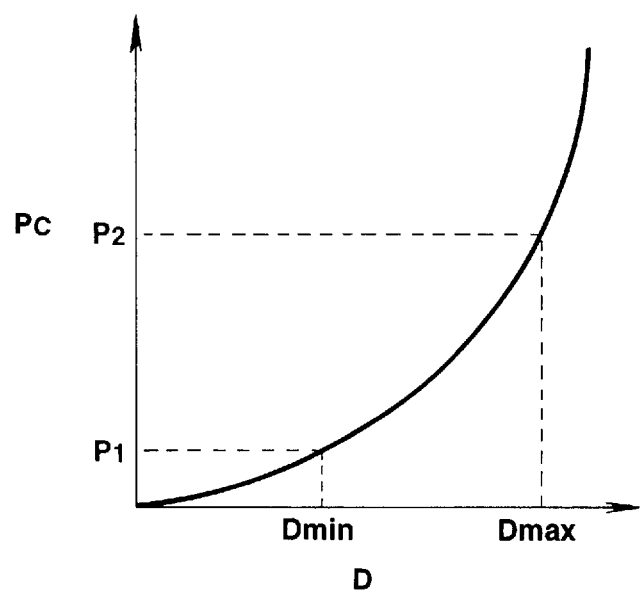
FIG. 9 is a graph illustrating a relationship between a duty ratio D and the clutch pressure PC.

Referring to FIG. 9, there is shown the duty ratio D versus clutch pressure PC characteristic. As appreciated from the characteristic, the clutch pressure PC is varied in a non-linear fashion i.e., essentially in a parabolic fashion. Actually, the clutch pressure PC is adjusted from a predetermined low-level clutch pressure P1 to a predetermined high-level clutch pressure P2 (corresponding to the maximum clutch pressure), as the duty ratio D is shifted from a minimum duty ratio Dmin (near 0%) to a maximum duty ratio Dmax (for example 100%). As can be appreciated from FIGS. 7 to 9, the distribution ratio of driving torque of the front wheels to the rear wheels can be adjusted within a range of 0:100% to 50%:50%. In case of the duty ratio D less than the minimum duty ratio Dmin, the clutch 66 is held at its clutch stand-by state in which there is less clutch pressure and thus there is no transmission of driving torque through the friction plates 66b and the friction disks 66d in excessively light contact.

On the other hand, the microcomputer 8 consists of an input interface 8a such as an input interface circuit, an arithmetic processor 8b, a memory 8c such as a read only memory (ROM) and a random access memory (RAM), and an output interface 8d such as an output interface circuit. The input interface 8a receives the signals SY, SA2 and SA3 for converting these signals to digital signals, while the output interface 8d has a digital-to-analog conversion function to output the control signal SM to the motor drive circuit 103.

Figure 10:
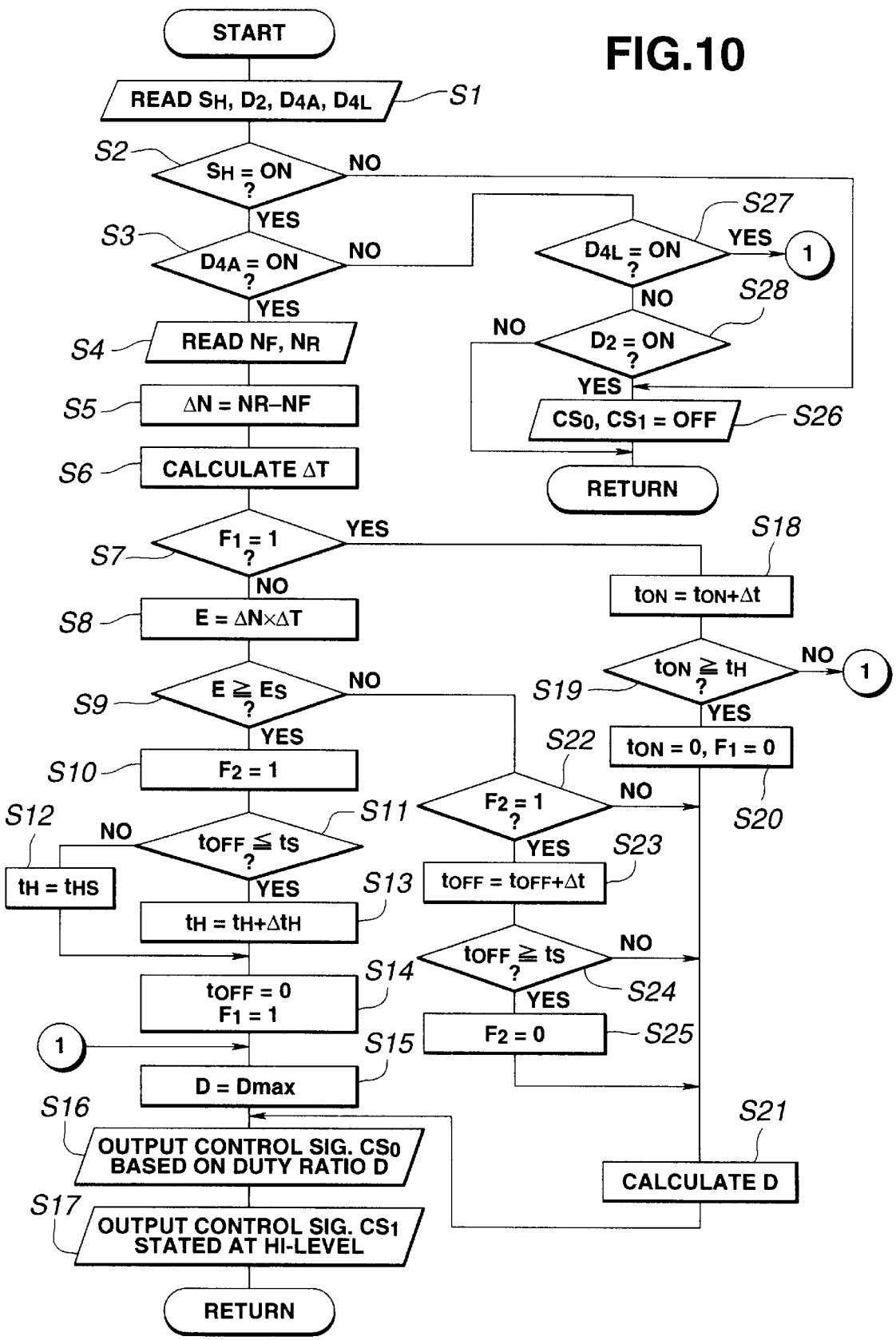
FIG. 10 is a flow chart illustrating a procedure of a driving-torque distribution control (a four-wheel-drive control) executed by the four-wheel-drive control system of the invention.

According to the arithmetic processing indicated in FIG. 10. the microcomputer 7 detects an input load condition of the friction clutch 66 on the basis of the front-and-rear wheel speed difference ΔN derived from the front-wheel revolution-speed indicative signal value NF and the rear-wheel revolution-speed indicative signal value NR. As detailed later, the microcomputer 7 determines the load condition of the friction clutch on the basis of the product of the derived wheel speed difference ΔN and the target torque ΔT for the front wheels (auxiliary drive wheels). When the microcomputer 7 determines that the clutch 66 is in a high load condition, under a particular condition wherein the four-wheel-drive mode (D4A) is selected and the high-speed shift position indicative signal SH is maintained at a high signal level, the microcomputer 7 operates to hold the duty ratio D at a maximum duty ratio Dmax for a holding time duration $t_H$, with the result that the clutch 66 is held in the completely engaged state for the holding time duration $t_H$. In this case, the control signal CS0 based on the maximum duty ratio Dmax is produced to produce a maximum clutch pressure P2 in the clutch pressure control valve 122 and the control signal CS1 is generated to energize the pilot-operated directional control valve 120.

In contrast to the above, when the microcomputer 7 determines that the clutch 66 is not in the high load condition, under the above-noted particular condition (in case of the signals D4A and SH each of which is held at a high signal level), the microcomputer 7 derives the target torque ΔT on the basis of the wheel speed difference ΔN in accordance with the characteristic curve indicated in FIG. 7 and derives a target clutch pressure PC from the derived target torque ΔT in accordance with the predetermined data map indicated in FIG. 8 and finally derives a target duty ratio D from the derived target clutch pressure PC in accordance with the predetermined data map indicated in FIG. 9. In this case, the engaging force of the clutch 66, i.e., the torque distribution ratio of the front wheels to the rear wheels, is variably adjusted in response to variations in the duty ratio D. In case that the four-wheel-drive lock-mode (D4L) is selected and the high-speed shift position indicative signal SH is maintained at a high signal level, the microcomputer 7 sets the duty ratio D at the maximum duty ratio Dmax with the result that the control signal CS0 is shifted to a maximum signal level correlated with the maximum duty ratio and the control signal CS1 is maintained at a high signal level so as to maintain the clutch 66 at the completely engaged state (the clutch locked state). On the other hand, when the two-wheel-drive mode (D2) is selected and the high-speed shift position indicative signal SH is maintained at a low signal level, i.e., the high-speed/low-speed switching mechanism 64 is held in the neutral position N or in the low-speed shift position L, the microcomputer 7 sets the duty ratio D at the minimum duty ratio Dmin with the result that the control signal CS0 is shifted to a minimum signal level for example zero and the control signal CS1 is maintained at a low signal level, for example zero, so as to maintain the clutch 66 at the completely disengaged state.

The driving-torque distribution control procedure of the microcomputer 7 will be hereinafter described in detail in accordance with the flow chart shown in FIG. 10. The driving-torque distribution control is actually achieved by controlling the clutch pressure PC on the basis of the duty ratio D. The control routine for the driving-torque distribution between the front and rear wheels is executed as time-triggered interrupt routines to be triggered every predetermined time intervals $\Delta t$ such as 20 msec.

In step S1, the high-speed shift position indicative signal SH from the position sensor 86, the selection signals D2, D4A and D4L from the mode-select switch 90, are read out.

In step S2, a test is made to determine whether the high-speed shift position indicative signal SH is held at a high signal level (in the ON state). The answer to step S2 is affirmative (YES), i.e., when the shift sleeve 64b is shifted to the high-speed shift position H, step S3 proceeds in which a test is made to determine whether the four-wheel-drive auto-mode indicative selection signal D4A is held at a high signal level (in the ON state). The answer to step S3 is affirmative (YES), i.e., when the four-wheel-drive auto-mode is selected by the mode-select switch 90, step S4 enters in which the front-wheel revolution-speed indicative signal value NF and the rear-wheel revolution-speed indicative signal value NR are read out.

In step S5, the front-and-rear wheel speed difference $\Delta N$ is derived from an equation $\Delta N=NR-NF$. The previous wheel speed difference indicative data already stored in a predetermined memory address of the memory 7c is updated by the newly derived wheel speed difference $\Delta N$.

In step S6, the target torque $\Delta T$ to be transmitted to the front wheels is calculated on the basis of the wheel speed difference $\Delta N$ in accordance with the characteristic curve indicated in FIG. 7. The previous target torque already stored in a predetermined memory address of the memory 7c is updated by the newly derived target torque $\Delta T$.

In step S7, a test is made to determine whether a flag F1 is set at "1". The flag F1=1 means that the friction clutch 66 is controlled to be in the completely engaged state. Therefore, the flag F1 will be hereinafter referred to as a "completely-engaged-state indicative flag". When the answer to step S7 is negative (NO), i.e., in case of F1=0, step S8 proceeds in which a load E input into the friction clutch 66 is calculated from the following expression (1) on the basis of the wheel-speed difference $\Delta N$ and the target torque $\Delta T$ to be transmitted to the front wheels (the auxiliary drive wheels).

$$E=\Delta N \times \Delta T \tag{1}$$

In step S9, a test is made to determine whether the calculated load E of the friction clutch 66 is greater than or equal to a predetermined threshold Es. When the answer to step S9 is affirmative (YES), i.e., when an inequality $E \geq Es$ is satisfied in step S9, the microcomputer 7 determines that the friction clutch 66 is in a high-load condition. In case of $E \geq Es$, step S10 enters a flag F2 representative of a high-load condition of the clutch 66 is set at "1". The flag F2 will be hereinafter referred to as a "high-load-condition indicative flag".

In step S11, a test is made to determine whether a first elapsed time tOFF, which time is counted from the time when the previous completely engaged state of the clutch 66 has terminated, is below a preset time period ts, such as 0.2 sec. As can be appreciated from steps S22, S23, S24 and S25, explained later, the step S11 is provided to determine whether or not the high-load condition of the clutch 66 continues. In case of an inequality tOFF>ts is satisfied, i.e., when the answer to step S11 is negative (NO), the microcomputer 7 determines that the high-load condition does not continue any longer. Thereafter, step S12 proceeds in which the holding time duration $t_H$ is set at an initial value $t_{HS}$ such as 2 sec. As previously explained, the duty ratio D is held at the maximum duty ratio Dmax for the holding time duration $t_H$ so as to maintain the clutch 66 at its completely engaged state. For the reasons set forth above, the following steps S14, S15, S16 and S17 are provided. Conversely, in case of an inequality tOFF$\leq$ts is satisfied, i.e., when the answer to step S11 is affirmative (YES), the microcomputer 7 regards the load condition of the clutch 66 as still held at the high-load condition. Thereafter, step S13 proceeds in which the holding time duration $t_H$ is updated by adding a predetermined increment $\Delta t_H$ to the current holding time duration $t_H$ already stored in a predetermined memory address of the memory 7c.

In step S14, the elapsed time tOFF is cleared to "0" and additionally the completely-engaged-state indicative flag F1 is set at "1". In step S15, the duty ratio D is set at the maximum duty ratio Dmax. In step S16, the control signal CS0 based on the maximum duty ratio Dmax is output to the drive circuit 31a. In step S17, the control signal CS1 of a high signal level (an ON state) is output to the drive circuit 31b, so as to energize the directional control valve 120. Thereafter, a predetermined main program has been recovered.

On the other hand, the answer to step S7 is affirmative (YES), i.e., in case of F1=1, step S18 proceeds in which a second elapsed time tON, which time is counted from the time when the current completely engaged state of the clutch 66 begins, is updated as a new elapsed time which is obtained by adding the predetermined time interval $\Delta t$ (corresponding to a period of the time-triggered interrupt routine) to the current second elapsed time tON. The previous second elapsed time tON already stored in a predetermined memory address of the memory 7c is updated by the new elapsed time tON. Thereafter, step S19 enters in which a test is made to determine whether the second elapsed time tON has been reached the holding time duration $t_H$ set at step S12 or S13. In case of tON<$t_H$, the control procedure transfers to step S15. In contrast, in case of tON$\geq t_H$, the procedure flows to step S20 in which the second elapsed time tON is cleared to "0" and additionally the completely-engaged-state indicative flag F1 is reset to "0". After this, step S21 enters in which the clutch pressure PC is calculated on the basis of the target torque $\Delta T$ (derived at step S6) in accordance with the data map indicated in FIG. 8, and additionally the duty ratio D is calculated on the basis of the calculated clutch pressure PC in accordance with the data map indicated in FIG. 9. Thereafter, the procedure shifts to step S16.

In the case that the answer to step S9 is negative (NO), i.e., in case of E<Es, the microcomputer determines that the clutch 66 is out of its high-load condition. Thereafter, step S22 proceeds in which a test is made to determine whether the high-load-condition indicative flag F2 is set at "1". When the answer to step S22 is negative (NO), i.e., in case of F2=0, the control procedure shifts to step S21. In contrast, when the answer to step S22 is affirmative (YES), i.e., in case of F2=1, step S23 enters in which the first elapsed time tOFF is updated by a new first elapsed time tOFF which is obtained by adding the predetermined time interval Δt to the current first elapsed time tOFF already stored in the predetermined memory address of the memory 7c. Thereafter, step S24 proceeds in which a test is made to determine whether the updated or incremented first elapsed time tOFF is above the preset time period ts. The answer to step S24 is negative (NO), i.e., in case of tOFF<ts, the control procedure shifts to step S21. The answer to step S24 is affirmative (YES), i.e., in case of tOFF≧ts, the microcomputer determines that the preset time period ts has been reached and thus it is not necessary to monitor the first elapsed time any longer. The procedure flows from step S24 to step S25. The high-load-condition indicative flag F2 is reset to "0" in step S25, and then the procedure shifts to step S21.

Furthermore, when the answer to step S2 is negative (NO), i.e., when the high-speed shift position indicative signal SH is held at a low signal level (in the OFF state), the microcomputer 7 determines that the shift sleeve 64b of the high-speed/low-speed switching mechanism 64 of the sub-gearchange mechanism 58 is shifted to the neutral position N or to the low-speed shift position L. In this case, step S26 enters in which the control signal CS0 of a low signal level (an OFF state) and the control signal CS1 of a low signal level (an OFF state) are produced to de-activate the drive circuits 31a and 31b and consequently to de-energize the solenoids 128d and 120d. As a result, the clutch pressure PC is extinguished and thus the friction clutch 66 is held in the dis-engaged state. Thereafter, the main program has been recovered.

Moreover, when the answer to step S3 is negative (NO), i.e., in case of the four-wheel-drive auto-mode D4A is not selected, step S27 proceeds in which a test is made to determine whether the four-wheel-drive lock-mode is selected. When the answer to step S27 is affirmative, the procedure flows to step S15 in such a manner as to set the duty ratio D to the maximum duty ratio Dmax. When the answer to step S27 is negative, step S28 proceeds in which a test is made to determine whether the two-wheel-drive mode D2 is selected. When the answer to step S28 is affirmative, step S26 proceeds in a manner so as to maintain the control signals CS0 and CS1 at their OFF states (low signal levels). In contrast, when the answer to step S28 is negative, the time-triggered interrupt routine terminates.

In the control flow indicated in FIG. 10, steps S8 and S9 contribute to detect the load condition of the friction clutch 66 accommodated in the transfer 22. Steps S10 to S15 contributes to properly compensate the engaging force of the friction clutch 66 under the high-load condition detected by way of steps S8 and S9, such that the clutch 66 is maintained in the completely engaged state for the suitably selected holding time duration $t_H$. This control procedure is very important to anticipatively suppress the friction clutch 66 accommodated in the transfer 22 from being overheated. Of these steps S10 to S15, steps S11 to S13 is necessary to properly vary the holding time duration $t_H$, depending on the high-load condition of the friction clutch 66. On the other hand, steps S4 to S6 and step S21 is necessary for the driving-torque distribution ratio control between the front and rear wheels.

The four-wheel-drive control system, made according to the invention, operates as follows.

On the assumption that the vehicle is stopped, the shift lever of the automatic transmission 20 is shifted to the P position (park range), the sub-gearchange lever is held at the 4H range, the two-wheel-drive mode is selected by the mode-select switch 90, and additionally the engine 10 is in its stopped state, the ignition switch is turned ON to start the engine. Then, the controller 18 is switched ON and thus the previously-described arithmetic processing is started by the respective microcomputers 7 and 8. Under these conditions, when the vehicle is still stopped and the shift lever of the transmission 20 is held in the parking position and thus the engine power is not transferred to the transmission output shaft, the input shaft 42 of the transfer 22 and the first output shaft 44 are not driven. In this case, the main pump 100 of the hydraulic pressure supply system 16 is not driven and thus the line pressure PL in the oil supply line 110a is kept at substantially zero. Therefore, the pressure switch 132 is switched ON so as to output the line pressure indicative signal SA2 into the microcomputer 8. When the microcomputer 8 receives the line pressure indicative signal SA2, the microcomputer 8 determines a rotational speed of the motor 102 on the basis of the oil temperature indicative signal SY from the sensor 130, and outputs the drive signal SM based on the determined rotational speed of the motor 102 to the motor drive circuit 103. In this manner, the sub-pump 104 is driven in order to adjust the line pressure PL at the predetermined pressure level. In this manner, when the line pressure PL reaches the predetermined pressure level owing to rotation of the sub-pump 104, the pressure switch 132 is switched OFF and then the motor 102 is stopped again. On the other hand, the microcomputer 7 executes the control routine indicated in FIG. 10. Under the above-mentioned conditions, since the sub-gearchange lever is held in the 4H range, the high-speed shift position indicative signal SH is conditioned in the ON state (at a high signal level). Also, since the two-wheel-drive mode is selected by the mode-select switch 90, the control procedure shifts from step S2 through steps S3, S27 and S28 to step S26, and thus the control signals CS0 and CS1 for the solenoids 128d and 120d, are maintained at their OFF states (low signal levels). As a result, the electromagnetic directional control valve 120 is responsive to the control signal CS1 of the low signal level, to maintain its valve position at the normal position shown in FIG. 4, in which the fluid communication between the inlet and outlet ports 120A and 120B is blocked and the outlet port 120B communicates the drain port 120D, and as a result there is no supply of the pilot pressure from the outlet port 120B to the external pilot port 126P1 of the pilot-operated directional control valve 126. For this reason, the directional control valve 126 is held in its normal position shown in FIG. 4, in which the fluid communication between the inlet and outlet ports 126A and 126B is blocked and in lieu thereof the inlet port 126A and the drain port 126D are communicated with each other. Thus, there is no supply of the clutch pressure PC to the inlet port 74 of the friction clutch 66. In addition, since the control signal CS0 is held in the OFF state, the duty-ratio controlled electromagnetic solenoid valve 128 is also held in its normal position shown in FIG. 4, and thus there is no supply of the pilot pressure from the outlet port 128B to the external pilot port 122P2 of the clutch pressure control valve 122. As a result, the clutch pressure PC produced by the clutch pressure control valve 122 is maintained at substantially zero, and thus the friction clutch 66 is held in its dis-engaged state (the clutch releases state). In this case, there is no transmission of driving torque between the first output shaft 44 and the first sprocket 68, and as a result the driving mode of the vehicle is maintained at the two-wheel-drive mode.

Thereafter, for the purpose of a straight-ahead driving on good roads, the shift lever of the transmission will be shifted to the D position (drive range), and then the accelerator pedal will be depressed after release of the brakes. At this time, the vehicle is firstly operated at the two-wheel-drive mode in which the driving torque transmitted from the transmission output shaft to the input shaft 42 of the transfer 22, is delivered through the shift sleeve 64b, the first output shaft 44, the rear propeller shaft 30, the rear differential 32 and the drive shafts 34 to the rear-left and rear-right wheels 12RL and 12RR, so as to permit the vehicle to go ahead by way of the rear-wheel drive. In this manner, when the vehicle starts to run and the first output shaft 44 is rotatively driven, the main pump 100 mechanically linked to the shaft 44 is rotated to discharge working fluid (hydraulic oil) therefrom and to provide pressurized hydraulic oil to the supply line 110a. When the pressurized hydraulic oil is properly regulated at the predetermined line pressure level by way of the line-pressure regulating valve 118, the pressure switch 132 is switched OFF and then the sub-motor 102 is stopped in response to the instruction of the microcomputer 8.

When the road surface condition is changed from a good road surface condition to a bad or rough road surface condition (a low-frictional road surface condition), such as sandy or muddy roads, snow or icy roads or the like, and the vehicle travels on the low-frictional roads, the four-wheel-drive auto-mode D4A will be selected by the mode-select switch 90. In the case that the four-wheel-drive auto-mode is selected and the selection signal D4A is held at a high signal level (an ON state), the four-wheel-drive auto-mode procedure is executed to create the flow from step S3 to step S4 in the routine shown in FIG. 10. According to the four-wheel-drive auto-mode procedure, the wheel-speed difference $\Delta N$ is derived through steps S4 and S5, and then the target torque $\Delta T$ is calculated at step S6. Assuming that the completely-engaged-state indicative flag F1 is reset to "0", the calculated value E of the input load applied to the friction clutch 66 is compared with the predetermined threshold Es through steps S8 and S9. When the calculated value E of the input load is a smaller value than the threshold Es, the procedure shifts from step S9 through S22 to step S21 in which the duty ratio D for the solenoid 128d is derived from the calculated target torque $\Delta T$. Thereafter, the procedure shifts to step S16 so as to produce the control signal CS0 based on the derived duty ratio D. Thus, the exciting current io based on the derived duty ratio D is supplied to the solenoid valve 128, with the result that the clutch pressure PC can be produced at the clutch pressure control valve 122 in response to the duty ratio determined at step S21. Subsequently to step S16, since the control signal CS1 is shifted to the ON state (the high signal level) in step S17, the solenoid 120d of the directional control valve 120 is activated to shift its valve position from the normal position 120b to the activated position 120c, and thus the line pressure PL is supplied directly to the pilot-operated directional control valve 126. The directional control valve 126 is also shifted from the normal position 126b to the activated position 126c. Accordingly, the clutch pressure PC is supplied from the valve 122 through the valve 126 to the inlet port 74 of the clutch 66.

During the four-wheel-drive auto-mode procedure, in case of a comparatively small wheel-speed difference $\Delta N$, the duty ratio D is also set at a comparatively small ratio. Thus, the clutch pressure PC is set at a comparatively low pressure level, with the result that the clutch 66 is slightly engaged or dis-engaged. In this case, there is less transmission of driving torque to the front wheels (the auxiliary drive wheels) and thus the driving-torque distribution ratio of the front wheels to the rear wheels may become equivalent to 0:100%. In contrast to the above, during the four-wheel-drive auto-mode procedure, in case of a comparatively great wheel-speed difference $\Delta N$ owing to wheel-slip at the rear wheels 12RL and 12RR, the duty ratio D is also set at a comparatively great ratio. Thus, the clutch pressure PC is set at a comparatively high pressure level, with the result that the clutch 66 is strongly engaged. In this case, there is great transmission of driving torque to the front wheels (the auxiliary drive wheels) and thus the driving-torque distribution ratio of the front wheels to the rear wheels may become equivalent to 50%:50%. In this manner, during the four-wheel-drive auto-mode procedure, the torque distribution ratio can be properly adjusted depending on the duty ratio D based on the front-and-rear wheel speed difference $\Delta N$.

During driving at the four-wheel-drive a-to-mode D4A, in the event that the rear wheel skid develops greatly, the product ($\Delta N \times \Delta T$) of the wheel speed difference $\Delta N$ and the calculated target torque $\Delta T$ also becomes great. That is, the load E of the clutch 66 may exceed the predetermined threshold Es. Under such a high-load condition of the clutch 66, when the time-triggered interrupt routine shown in FIG. 10 is executed, the procedure flows from step S9 to step S10. In such a case, the high-load-condition indicative flag F2 is set at "1" in step S10. Supposing that a relatively long time has been elapsed until a high-load condition of the friction clutch is detected through the current time-triggered interrupt routine after resetting the completely-engaged-state indicative flag F1 to "0", the first elapsed time tOFF must be above the preset time period ts. In this case, the procedure shifts from step S11 to step S12 in which the holding time duration $t_H$ for the completely engaged state of the clutch 66 is set at its initial value $t_{HS}$, such as 2 sec. Thereafter, the first elapsed time tOFF is cleared to "0" and additionally the completely-engaged-state indicative flag F1 is set to "1". Subsequently, the duty ratio D is set to the maximum duty ratio Dmax (100%) in step S15, with the result that the maximum clutch pressure P2 is supplied to the clutch 66 and thus the clutch 66 is maintained at the completely engaged state in which there is no slip between the friction plates 66b and the friction disks 66d. Thus, the temperature rise in the friction clutch 66 can be effectively suppressed.

Subsequently to the previously-noted interrupt routine, when a new time-triggered interrupt routine shown in FIG. 10 is executed, the procedure flows from step S7 to step S18, since the completely-engaged-state indicative flag F1 has already been set at "1" through the previous interrupt routine. By way of steps S18 and S19, the second elapsed time tON is counted and the duty ratio D is maintained at the maximum duty ratio Dmax until the second elapsed time tON reaches the holding time duration $t_H$ ($t_{HS}$) (See the flow from step S19 through steps S15, S16, S17, S1, S2, S3, S4, S5, S6 and S7 to S18). Wher the second elapsed time tON has been reached the holding time duration $t_H$, step S21 enters in order to set the duty ratio D based on the wheel-speed difference $\Delta N$ derived in step S5 of the this interrupt routine. Thus, the clutch pressure PC is properly adjusted depending on the wheel speed difference $\Delta N$. In this manner, a normal flow of the four-wheel-drive auto-mode recovers from the previously-noted particular flow of the high-load condition of the clutch.

When the normal flow has been recovered, the procedure shifts from step S7 via step S8 to step S9 in a subsequent interrupt routine, so as to monitor the load condition of the clutch 66. In this subsequent interrupt routine, when the input load E of the clutch is less than the predetermined threshold Es, the procedure flows from step S9 to step S22. At this time, since the high-load-condition indicative flag F2 is still set at "1", step S23 proceeds in which the first elapsed time tOFF stored in the memory 7c before one cycle of the current interrupt routine, is incremented by the predetermined time interval Δt. Thereafter, a judgment is made to determine whether the incremented first elapsed time tOFF reaches the preset time period ts at step S24. When the incremented first elapsed time tOFF does not yet reach the preset time period ts, the procedure flows from step S24 to step S21, so as to continue the normal four-wheel-drive auto-mode. Under this condition, if the high-load condition (E≧Es) of the clutch 6 is detected again, the procedure flows from step S9 through step S10 to step S11 in which the first elapsed time tOFF is compared with the preset time period ts. As appreciated from the flow from step S24 through steps S21, S16, S17, S1, S2, S3, S4, S5, S6, S7, S8, S9 and S10 to step S11, since the answer to step S24 is negative (NO), that is, the first elapsed time tOFF is less than the preset time period ts, the procedure flows from step S11 to step S13 in which the holding time duration $t_H$ stored in the memory 7c is increasingly compensated by the predetermined increment $\Delta t_H$ such as 2 sec. Thereafter, the first elapsed time tOFF is cleared to "0" and additionally the completely-engaged-state indicative flag F1 is set at "1". In this manner, the engagement state of the clutch 66 is quickly changed from the clutch slipping-engagement state to the clutch completely-engaged state, when detecting the high-load condition of the clutch through steps S8 and S9. In this case, since the current holding time duration is set at a longer time duration than the previous holding time duration, due to the increment ΔtH, the completely-engaged state of the clutch 66 can be continued for a longer time duration represented by $(t_H+\Delta t_H)$. This certainly avoids excessive development of frictional heat in the friction clutch 66. In the event that the high-load condition is frequently detected by way of steps S8 and S9 until the first elapsed time tOFF reaches the preset time period ts, the holding time duration $t_H$ is increasingly compensated in proportion to an increase in a repeat count of detection of the high-load condition, thereby enhancing an accuracy of avoidance of excessive development of frictional heat in the clutch 66. Thereafter, the procedure flows from step S7 through steps S18 and S19 finally to step S20 in a new interrupt routine. At step S20, the second elapsed time tON is cleared to "0" and the completely-engaged-state indicative flag Fl is reset to "0", so as to release from the clutch completely-engaged state. Thereafter, assuming that the high-load condition of the clutch 66 does not occur for a while, the flow from step S9 via step S22 to step S23 occurs repeatedly, and as a result the first elapsed time tOFF reaches the preset time period ts. As soon as the preset time period ts has been reached, the procedure flows from step S24 to step S25 so as to reset the high-load-condition indicative flag F2 to "0". Thereafter, in the event that the low-load condition of the clutch 66 continues, the procedure flows from step S9 via step S22 to step S21. In case of the flow from step S9 via step S22 to step S21, count-up of the first elapsed time tOFF is not made.

Thereafter, in the event that the high-load condition is detected again by way of steps S8 and S9, the procedure flows from step S9 via step S10 to step S11. In this case, since the first elapsed time tOFF is still held above the preset time period ts. step S12 proceeds in which the holding time duration $t_H$ is reset to the initial value tHS. In this manner, the above-explained interrupt routine is cyclically executed every predetermined time intervals Δt.

Assuming that the vehicle was stuck in sandy or muddy roads under a driving condition wherein the four-wheel-drive auto-mode is selected by the mode-select switch 90, and additionally the 4H range is selected by the sub-gearchange lever, or assuming that the vehicle travels on sandy or muddy roads in which the vehicle may be stuck easily, the driver must change the sub-gearchange lever from the 4H range to the 4L range. In this case, the vehicle is firstly transferred from the running state to the stopping state, and then the shift lever is shifted to the N position (neutral range) or to the P position (park range), and additionally the sub-gearchange lever is shifted from the 4H range via the N range to the 4L range. Under these conditions, since the high-speed shift position indicative signal SH is maintained in a low signal level (the OFF state), the procedure jumps from step S2 to step S26 in the interrupt routine shown in FIG. 10, and as a result the two control signals CS0 and CS1 are held at their low signal levels (the OFF states). Therefore, there is no output of the exciting current ii from the drive circuit 31b, and as a result the directional control valve 120 is recovered from the activated position 120c to the normal position 120b shown in FIG. 4, by way of the bias of the return spring 120a. There is no supply of the pilot pressure from the electromagnetic directional control valve 120 to the pilot-operated directional control valve 126. Thus, the directional control valve 126 is also recovered from the activated position 126c to the normal position 126b, by the aid of the bias of the return spring 126a. With the control signal CSO stated in the low signal level, there is no supply of the external pilot pressure from the duty-ratio controlled solenoid valve 128 to the clutch pressure control valve 122, with the result that the controlled clutch pressure PC produced by the clutch pressure control valve 122 is reduced to zero. Under these conditions, there is no supply of the clutch pressure PC to the inlet port 74 of the friction clutch 66. As a result, the clutch 66 is recovered to the clutch dis-engaged state, in a manner so as to allow a relative rotation between the first output shaft 44 and the first sprocket 68. This relative rotation ensures easy shift from the high-speed shift position H to the low-speed shift position L, and thus permits the internal toothed portion 64b1 of the shift sleeve 64b to be smoothly brought into meshed engagement with the gear 80 of the first sprocket 68. Under the condition wherein the four-wheel-drive low-speed shift position 4L is selected by the sub-gearchange lever, the driving torque output from the transmission 20 is transmitted into the input shaft 42 of the transfer 22, and the output speed is reduced by the sub-gearchange mechanism 58 kept in the 4L range and in lieu thereof the output driving-torque is increased. A torque component of the increased driving-torque is transmitted through the low-speed shift gear 64d of the pinion carrier 62d, the external toothed portion 64b2 of the shift sleeve 64b and the internal toothed portion 64b1 of the shift sleeve 64b to the first output shaft 44. In addition, the remaining torque component of the increased driving torque is transmitted through the gear 80 engaged with the internal toothed portion 64b1 of the shift sleeve 64b, the first sprocket 68, the chain 7 and the second sprocket 70 to the second output shaft 54. In this manner, the driving torque transmitted into the input shaft 42 is forcibly distributed into the first and second output shafts 44 and 54, by way of the engagement between the low-speed shift gear 64d and the external toothed portion 64b2 and the engagement between the internal toothed portion 64b1 and the gear 80, and whereby the vehicle is operated in the four-wheel-drive condition.

In the previously-explained embodiment, although the four-wheel-drive control system of the present invention is exemplified in case of the four-wheel drive vehicle with the automatic transmission ordinarily employing a revolution-speed sensor at its transmission output shaft, the system can be applied to a four-wheel drive vehicle with a manual transmission. In this case, a revolution speed of the output shaft can be detected by utilizing a revolution-speed detecting device for a speed meter of the vehicle. In the embodiment, although the shift sleeve 64b of the sub-gearchange mechanism 58 is manually shifted between the 4H range and the 4L range by way of the sub-gearchange lever, the shift sleeve may be powered by way of an electric motor in response to one of a plurality of modes which are selectable by a mode-select switch.

Furthermore, although the duty-ratio controlled electromagnetic solenoid valve 128 is used for adjusting the clutch pressure PC in conjunction with the clutch pressure control valve 122 consisting of an internal- and external-pilot operated, spring-offset pressure regulating valve, the duty-ratio controlled electromagnetic solenoid valve 128 may be replaced with a proportional control type electromagnetic solenoid valve whose output pressure is adjustable in proportion to the magnitude of an exciting current applied to the solenoid. In this case, a drive circuit for the solenoid of the proportional control type electromagnetic solenoid valve may be comprised of a floating type constant-voltage circuit which can output an exciting current i0 proportionally variable in response to a voltage signal value of the control signal CS0 consisting of a voltage signal.

Moreover, in the embodiment, the hydraulic pressure supply system is so designed that the vehicle is operated in the two-wheel-drive mode D2 when the exciting currents i0 and i1 are both shifted to the OFF states (the low-level exciting currents). Alternatively, the hydraulic pressure supply system may be so designed that the vehicle is operated in a four-wheel-drive mode such as the four-wheel-drive auto-mode D4A when the exciting currents i0 and i1 are both shifted to the OFF states. In this case, in FIG. 4, the normal position and the activated position of each of the valves 120, 126 and 128 must be inverted to each other. Also, in the flow chart indicated in FIG. 10, the ON and OFF states of each of the control signals CS0 and CS1 must be inverted to each other. Additionally, the setting of the duty ratio D must be varied such that the duty ratio D is in reverse proportion to the front-and-rear wheel-speed difference $\Delta N$.

In the embodiment, in the event that a high-load condition of the friction clutch 66 is detected again under a condition in which the first elapsed time tOFF does not yet reach the preset time period ts, the holding time duration $t_H$ is increasingly compensated. In a modification of the embodiment, when the number of occurrence of the completely engaged state of the clutch per unit hour exceeds a preset value, the holding time duration may be increasingly compensated.

Furthermore, although the system of the present invention is applied to the clutch engaging-force control of the transfer 22 with the sub-gearchange mechanism 58, it will be appreciated that the improved system can be applied to the clutch engaging-force control of a transfer not including a sub-gearchange mechanism. Although the system is applied to a part-time four-wheel drive vehicle with a transfer clutch, the system may be applied to a full-time four-wheel-drive vehicle with a transfer clutch and a center differential.

As will be appreciated from the above, when a high-load condition of a friction clutch is detected, the clutch can be controlled to be maintained in its completely engaged state for a holding time duration $t_H$, even during the four-wheel-drive auto-mode. Thus, this system can anticipatively avoid excessive development of frictional heat in the friction clutch depending on the load condition of the clutch, irrespective of a frictional-heat condition such as a temperature at frictional surfaces between friction plates and friction disks. In addition, in case that the high-load condition of the clutch continues for a while, the holding time duration can be increasingly compensated. Therefore, the improved system can avoid excessive development of frictional heat in the clutch with a higher accuracy. Also, since the microcomputer monitors the continuing state of the high-load condition of the clutch by comparing the first elapsed time tOFF, which time is counted from the time when the previous completely engaged state has terminated, with its preset time period ts such as 0.2 sec, and determines that the high-load condition still continues in case that the high-load condition is detected again before the first elapsed time tOFF reaches the preset time period ts. At the timing when determination of the high-load condition is made, the holding time duration $t_H$ can be increasingly compensated. Also, as soon as the first elapsed time tOFF reaches or exceeds the preset time period ts, the holding time duration tH can be recovered to its initial value $t_{HS}$, such as 2 sec. This prevents the holding time duration $t_H$ from being set at an undesiredly longer time duration. As set out above, the holding time $t_H$ can be accurately compensated by way of comparison the first elapsed time tOFF and the preset time period ts, thereby certainly preventing the clutch from being overheated. Alternatively, in case that the holding time duration $t_H$ is increasingly compensated when the frequency (the number of occurrence) of the completely engaged state of the clutch per unit hour exceeds a preset value, the same effect (an accurate setting of the holding time $t_H$) can be ensured. Additionally, since the load condition of the friction clutch can be easily monitored or detected by the product ($E = \Delta N \times \Delta T$) of the detected front-and-rear wheel-speed difference $\Delta N$ and the target torque $\Delta T$ derived on the basis of the wheel-speed difference $\Delta N$ from a predetermined data map (a predetermined torque characteristic curve shown in FIG. 7), the load condition of the clutch can be determined without providing a particular sensor required for detecting an input load applied to the friction clutch.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving-torque control system for a four-wheel-drive vehicle, said control system comprising:

a transfer clutch employed in a transfer of the four-wheel-drive vehicle for varying a distribution ratio of driving torque between front and rear road wheels depending on a front-and-rear wheel revolution-speed difference;

calculation means for deriving a command value of an engaging force of said transfer clutch from said front-and-rear wheel revolution-speed difference;

load-condition detection means for detecting an input load condition of said transfer clutch, on the basis of said front-and-rear wheel revolution-speed difference and said command value of said engaging force;

means for comparing said input load condition detected by said load-condition detection means with a predetermined threshold; and compensation means for compensating the engaging force of said transfer clutch so that said transfer clutch is held in a completely engaged state for a predetermined holding time duration, when said input load condition detected by said load-condition detection means exceeds said predetermined threshold.

2. The control system as set forth in claim 1, wherein said predetermined holding time duration is set to a duration longer than an initial value, when said load-condition detection means detects at least two consecutive high-load conditions each exceeding said Predetermined threshold, and an elapsed time, counted from a time when a first complete-engagement of said transfer clutch executed by said compensation means has terminated to a time when a subsequent complete-engagement of said transfer clutch executed by said compensation means begins, is below a preset time period.

3. The control system as set forth in claim 2, wherein said predetermined holding time duration is recovered to said initial value as soon as said elapsed time exceeds said preset time period.

4. The control system as set forth in claim 1, wherein said predetermined holding time duration is set to a duration longer than an initial value, when a number of occurrence per unit time of complete-engagements of said transfer clutch executed by said compensation means is above a predetermined number.

5. The control system as set forth in claim 1, wherein said input load condition detected by said load-condition detection means is derived as a product of said front-and-rear wheel revolution-speed difference and said command value of said engaging force of said transfer clutch.

6. A driving-torque control system for a four-wheel drive vehicle with main drive wheels and auxiliary drive wheels, said control system comprising:

a transfer clutch for variably adjusting a driving-torque distribution ratio between said main drive wheels and said auxiliary drive wheels by varying an engaging force of said transfer clutch;

speed difference detection means for detecting a speed difference between said main drive wheels and said auxiliary drive wheels;

calculation means for deriving a command value of said engaging force of said transfer clutch from said speed difference;

load-condition detection means for detecting an input load condition of said transfer clutch, on the basis of said speed difference and said command value of said engaging force;

means for comparing said input load condition detected by said load-condition detection means with a predetermined threshold;

engaging-force compensation means for compensating said engaging force of said transfer clutch so that said engaging force is held at a maximum for a predetermined holding time duration when said input load condition detected by said load-condition detection means exceeds said predetermined threshold; and holding-time-duration compensation means for monitoring a state of operation of said engaging-force compensation means, and for compensating said predetermined holding time duration in response to the state of operation of said engaging-force compensation means.

7. The control system as set forth in claim 6, wherein said holding-time-duration compensation means increases said predetermined holding time duration up to a duration longer than an initial value, when said load-condition detection means detects at least two consecutive high-load conditions each exceeding said predetermined threshold, and an elapsed time, counted from a time when a first complete-engagement of said transfer clutch executed by said engaging-force compensation means has terminated to a time when a subsequent complete-engagement of said transfer clutch executed by said engaging-force compensation means begins, is below a preset time period.

8. The control system as set forth in claim 7, wherein said holding-time-duration compensation means resets said predetermined holding time duration to said initial value as soon as said elapsed time exceeds said preset time period.

9. The control system as set forth in claim 6, wherein said predetermined holding time duration is set to a duration longer than an initial value, when a number of occurrence per unit time of complete-engagements of said transfer clutch executed by said engaging-force compensation means is above a predetermined number.

10. The control system as set forth in claim 6, wherein said input load condition detected by said load-condition detection means is derived as a product of said speed difference and said command value of said engaging force of said transfer clutch.

11. A driving-torque control system for a four-wheel-drive vehicle, said control system comprising:

a transfer clutch employed in a transfer of the four-wheel-drive vehicle for varying a distribution ratio of driving torque between front and rear road wheels depending on a front-and-rear wheel revolution-speed difference;

a calculation unit configured to derive a command value of an engaging force of said transfer clutch from said front-and-rear wheel revolution-speed difference;

a load-condition detection unit coupled to said transfer clutch and said calculation unit, said load-condition detection unit configured to detect an input load condition of said transfer clutch, on the basis of said front-and-rear wheel revolution-speed difference and said command value of said engaging force;

a comparing unit coupled to said load-condition detection unit and configured to compare said input load condition detected by said load-condition detection unit with a predetermined threshold; and a compensation unit coupled to said comparing unit and configured to compensate said engaging force of said transfer clutch so that said transfer clutch is held in a completely engaged state for a predetermined holding time duration, when the input load condition exceeds said predetermined threshold.

12. The control system as set forth in claim 11, wherein said predetermined holding time duration is set to a duration longer than an initial value, when said load-condition detection unit detects at least two consecutive high-load conditions each exceeding said predetermined threshold, and an elapsed time, counted from a time when a first complete-engagement of said transfer clutch executed by said compensation unit has terminated to a time when a subsequent complete-engagement of said transfer clutch executed by said compensation unit begins, is below a preset time period.

13. The control system as set forth in claim 12, wherein said predetermined holding time duration is recovered to said initial value as soon as said elapsed time exceeds said preset time period.

14. The control system as set forth in claim 11, wherein said predetermined holding time duration is set to a duration longer than an initial value, when a number of occurrence per unit time of complete-engagements of said transfer clutch executed by said compensation means is above a predetermined number.

15. The control system as set forth in claim 11, wherein said input load condition detected by said load-condition detection unit is derived as a product of said front-and-rear wheel revolution-speed difference and said command value of the engaging force of said transfer clutch.

\* \* \* \* \*